US011225041B2

(12) United States Patent
Sands et al.

(10) Patent No.: US 11,225,041 B2
(45) Date of Patent: Jan. 18, 2022

(54) SEPARATION SYSTEM

(71) Applicants: SandyLakes Limited, Hong Kong (CN); Bruce Keith Sands, New South Wales (AU)

(72) Inventors: Bruce Keith Sands, New South Wales (AU); Robert Mark Jeralds, Las Vegas, NV (US)

(73) Assignees: Bruce Keith Sands, New South Wales (AU); SandyLakes Limited, Hong Kong (CN)

( * ) Notice: Subject to any disclaimer, the term of this patent is extended or adjusted under 35 U.S.C. 154(b) by 240 days.

(21) Appl. No.: 16/316,281

(22) PCT Filed: Jul. 7, 2017

(86) PCT No.: PCT/AU2017/050706
§ 371 (c)(1),
(2) Date: Jan. 8, 2019

(87) PCT Pub. No.: WO2018/006137
PCT Pub. Date: Jan. 11, 2018

(65) Prior Publication Data
US 2019/0210314 A1    Jul. 11, 2019

(30) Foreign Application Priority Data

Jul. 8, 2016  (AU) ................................ 2016902688

(51) Int. Cl.
*B30B 9/12*    (2006.01)
*B01D 12/00*   (2006.01)
(Continued)

(52) U.S. Cl.
CPC .............. *B30B 9/127* (2013.01); *B01D 12/00* (2013.01); *B01D 29/118* (2013.01);
(Continued)

(58) Field of Classification Search
CPC .. B30B 9/12; B30B 9/127; B30B 9/14; B30B 9/18; B30B 9/262; B30B 9/06;
(Continued)

(56) References Cited

U.S. PATENT DOCUMENTS 3,585,924 A    6/1971  Nolan
3,938,434 A *  2/1976  Cox .......................... B30B 9/12
                                                          100/117
(Continued)

FOREIGN PATENT DOCUMENTS

CN          1059860 C  * 12/2000  ............... B30B 9/18
CN        204107154 U    1/2015
(Continued)

OTHER PUBLICATIONS

International Search Report for PCT Application No. PCT/AU2017050706 dated Aug. 17, 2017.
(Continued)

*Primary Examiner* — Adam J Eiseman
*Assistant Examiner* — Katie L. Parr
(74) *Attorney, Agent, or Firm* — Moser Taboada

(57) ABSTRACT

A separator system (1) and method for separating a mixture including said one or more liquids or semi-liquids and a loose, solid material substantially into liquid and solid phases. The system includes the components of: a compression separator (100) for separating the liquid from the solid material by compression; a vacuum supply (200) for generating suction to draw mixture into the separator via a feed line. The liquids are captured in a collection tank (301) and the solids in a hopper (320).

22 Claims, 16 Drawing Sheets

(51) Int. Cl.
   *B01D 29/11* (2006.01)
   *B30B 9/18* (2006.01)
   *B01D 29/64* (2006.01)

(52) U.S. Cl.
   CPC ............ *B01D 29/6476* (2013.01); *B30B 9/12* (2013.01); *B30B 9/18* (2013.01)

(58) Field of Classification Search
   CPC ......... B30B 9/062; B30B 15/30; B01D 29/23; B01D 29/25; B01D 29/356; B01D 29/6484; B01D 29/6492; B01D 2210/204
   USPC .................. 210/224, 225, 406, 452, 497.1
   See application file for complete search history.

(56) References Cited

U.S. PATENT DOCUMENTS

| | | | | |
|---|---|---|---|---|
| 6,170,580 B1 * | 1/2001 | Reddoch | ................ | B01D 29/23 |
| | | | | 175/66 |
| 2013/0105414 A1 * | 5/2013 | Olson | .................. | B01D 29/908 |
| | | | | 210/787 |
| 2015/0182879 A1 * | 7/2015 | Boerger | ............. | B01D 29/6476 |
| | | | | 210/770 |
| 2017/0361754 A1 * | 12/2017 | Trueman | ................... | B60P 1/16 |

FOREIGN PATENT DOCUMENTS

| | | | | |
|---|---|---|---|---|
| DE | 29511884 | U1 | 10/1995 | |
| JP | S60255300 | A | 12/1985 | |
| KR | 200183017 | Y1 * | 5/2000 | ............. B30B 15/30 |
| KR | 20030000985 | A * | 1/2003 | ............... B30B 9/12 |
| WO | WO-9608364 | A1 * | 3/1996 | ............... B30B 9/12 |

OTHER PUBLICATIONS

Qu et al. "Tenth Five-Year Plan" National Key Books, Handbook of Plastic Industry, Injection molding and mold pressing process and equipment.

* cited by examiner

SEPARATION SYSTEM

FIELD OF THE INVENTION

The invention relates to separation systems, including an apparatus and method for extracting liquids or semi-liquids sequestered in a solid material.

The invention has been developed for the separation of a mixture including one or more liquids and/or semi-liquids, and a loose, solid material, substantially into liquid and solid phases. One specific application for which the invention has been developed is the dewatering of solids. However, the method and system of the invention may also be applied to many other applications where the extraction of a liquid or semi liquid from a solid material is required.

BACKGROUND TO THE INVENTION

Separation devices for separating mixtures of liquids and solid materials are known in the art. Such devices may utilise a form of compression, whether provided by direct mechanical pressing or by inertial pressing, to physically squeeze liquid out of the solid material. Applications and usages include dewatering systems, chemical extraction processes and systems, paper and pulp production and many other industrial processes. Liquid extraction techniques and equipment may also be used during oil and chemical recovery spills and the like.

Compression screw presses use a helicoid screw rotating inside an elongate cylindrical perforated screen or compression chamber to move mixture from an inlet at one end toward an exit end of the press where the solid is discharged. As the material is moved by the screw through the chamber it is subjected to increasing pressure, forcing the liquid phase of the mixture to expel through the screen.

Compression is generally achieved in a screw press by one or more mechanisms including: increasing diameter shaft screw presses whereby the diameter of the shaft of the screw is increased, reducing volume and forcing material against the screen; variable pitch screw presses whereby the pitch of the flights of the screw is reduced, in stages and/or continuously again reducing available volume and compressing the material; converging compression chamber screw presses using a gradually converging compression chamber; and back-pressure is created within the chamber by use of a discharge regulator (door, choke, plate, stopper or plug) located at the discharge end of the press.

Usually the inlet of the press is connected to a simple hopper loader or feed chute and a feed mechanism is required to keep up steady delivery of the unprocessed mixture to the device for processing. Such delivery mechanisms are ordinarily specifically designed to contend with the nature and disposition of the contaminated loose solid material. That is to say, the fluidity of the mixture and how it is disbursed.

If the unprocessed mixture is substantially liquid, such as sewerage waste, one option is to use pumping equipment to pump the mixture to the separation device for processing. However the use of pumping equipment has disadvantages because the pump internals are directly exposed to any matter and/or debris contained in the mixture being processed. Unexpected foreign matter can be incompatible with the pumping equipment and may cause damage or shortening the pump's operational life. Furthermore, solid material and/or liquid itself may damage the pump internals, for instance, if either material is highly abrasive and/or corrosive to pump components. Moreover, pumping equipment such as down-hole pumping equipment may require submersion of the pump body to function, which limits applications to those where the fluid can be accessed and/or a suitable depth of fluid is available.

In any event, pumping equipment can only be used where materials are generally liquid and lend themselves to being pumped. Dryer solid or semi-solid mixtures, even if relatively loose and flowable generally cannot be pumped. In such cases, the mixture will need to be moved either in discrete lots by receptacles, (for instance, manually operated shovels, buckets, etc or mechanised scoops, buckets and tip trucks etc) or by continuous means such as a conveyor belt systems. It is noted that both solutions have significant drawbacks. Manual options are clearly unsuitable for large volumes, hazardous materials and where access is not possible. Mechanised conveying systems ordinarily require additional expensive equipment and are for the most part not automated, while continuous conveying solutions are generally only feasible for fixed plant and are usually unsuitable for handling sticky materials.

Other materials handling difficulties arise when the mixture is widely disbursed requiring the material to first be collected together. For instance, in the case of oil and chemical spills, and fracking water ponds.

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

SUMMARY OF THE INVENTION

In a first aspect, the invention provides a separator system for separating a mixture of one or more liquids and a loose, solid material, substantially into liquid and solid phases, the separator system including:

a housing having a housing wall defining a sealed housing interior;

a compression separator for separating liquid from the solid material by compression, the separator having a compression mechanism including a mixture compression chamber located within the housing interior, the compression chamber having a compression chamber wall including at least one filtration portion for retaining solid material within the compression chamber under compression while allowing fluid expelled from the solid material to pass through the filtration portion to be collected within the housing walls;

an inlet connected to the compression chamber for introducing mixture into the separator through the housing wall;

a solids outlet allowing processed solid material to be ejected from the compression chamber and housing; and a vacuum supply system fluidly connected to the housing interior for generating a vacuum within the compression chamber so as to draw unprocessed mixture through the inlet and into the compression chamber.

Advantageously the loose, solid material in the mixture is a sorbent material having sorbent properties such that it is capable of the sorption of a liquid by adsorption and/or absorption onto and/or within the sorbent material. The solid sorbent material may be an intrinsic solid component of a mixture of solid and liquid material. Alternatively, the solid sorbent material may be or include a sorbent "media" introduced for the sorption of a liquid from dry or "other" liquid environments such as a contacted waste stream liquid. The solid material may also comprise a number of different solid materials, some having superior sorbent properties to others.

Preferably, the housing includes a fluid collection cavity disposed between the compression chamber and the housing walls and at least one discharge port for discharging fluid from the fluid collection cavity.

Alternatively the separator housing forms a collection tank for collection of the fluid.

Preferably, the vacuum system is fluidly connected to the collection cavity to generate a vacuum within the cavity thereby drawing air through said at least one filtration portion and from the inlet via the compression chamber.

Preferably, the vacuum system is fluidly connected to the collection cavity via at least one discharge port.

Preferably, the system includes a separator feed line connected to said mixture inlet.

Alternatively the separator housing forms a collection tank for collection of the fluid.

Preferably the system includes a feed line cyclone filter having an inlet connected to mixture feed line; an air outlet connected the vacuum supply and a mixture outlet connected to the inlet of the compression chamber.

Preferably, the compression chamber is elongate having an upstream end opposite a downstream end, and the compression mechanism includes:

a compression screw having a screw shaft supporting a spiral screw vane, said compression screw mounted for rotation about a longitudinal screw axis within the elongate compression chamber, the compression screw for moving the mixture through the elongate compression chamber from the inlet at the upstream end of the chamber, to the solids outlet at the downstream end of the compression chamber, and for compacting the mixture within the compression chamber.

Preferably, the compression screw shaft is mounted on a stub axle, said stub axle rotationally mounted to and extending from the housing interior for connection to a motor and transmission for rotating the compression screw.

Preferably, the stub axle is mounted to and extends from the housing at the upstream end.

Preferably, the compression chamber includes axially aligned feed, and press sections, wherein the feed section is disposed adjacent the inlet at the upstream end of the compression chamber and the press section is disposed downstream the feed section.

Preferably, the press section of the compression chamber wall is formed of a cylindrical strainer cage thereby providing a filtration portion for retaining solid material under pressure while allowing fluid to pass from the compression chamber into the at least one collection cavity.

Preferably, the feed section of the compression chamber wall includes a strainer basket having an open top disposed adjacent the inlet, the strainer basket thereby providing a filtration portion for retaining solid material under pressure while allowing fluid to pass from the compression chamber into the at least one collection cavity.

Preferably, the strainer basket and cage are spaced from the housing wall thereby forming respective feed and press collection cavities disposed between the strainer basket and cage and the housing wall.

Preferably, a solids outlet regulator regulates solids ejected from the solids outlet.

Preferably, the downstream end of the compression chamber opens through a peripheral rim of said housing to define the solids outlet and wherein the solids outlet regulator includes a door choke member moveable between a closed position to cover and close off the solids outlet thereby preventing ejection of solids from the separator via the outlet, and an open position allowing solid material to be ejected from the separator under compression.

Preferably, said door choke member includes:

a tubular support sleeve coaxially mounted on a portion of the compression screw shaft extending from the housing beyond the solids outlet; and an annular outlet cover plate, said cover plate extending radially from said sleeve; and wherein said sleeve is axially slidable on said shaft for moving the door choke member between the closed position where said plate sealingly abuts the peripheral rim of the housing and the open position wherein said plate is spaced from the peripheral rim of the housing.

Preferably, said tubular support sleeve includes a press-in bushing providing for relative rotational movement between said shaft and said door choke member.

Preferably, the system includes a door choke member biasing arrangement to bias the door choke member and cover plate toward the closed position.

Preferably, said separator feed line includes a remotely controlled separator feed line valve for selectively closing off and opening the separator feed line.

Preferably, the solids outlet opens into a solids hopper for receiving solid material discharged from the separator and the hopper includes a hopper outlet disposed at a lower section of the hopper for emptying the hopper of solid material.

Preferably, said hopper is substantially air sealed and connected to a source of positive air pressure to generate a positive air pressure within said hopper to blow solid material in the hopper through the hopper outlet.

Preferably, the source of positive air pressure is delivered by the vacuum supply system via a positive pressure line.

Preferably, the system includes a hopper outlet line connected to said hopper outlet and said hopper outlet line includes a hopper outlet line valve for selectively closing off and opening the hopper outlet line.

Preferably, the system includes a first fluid collection compartment connected to a first discharge port for collecting the fluid expelled from the solid sorbent material. More preferably, the first fluid collection compartment is air sealed and the vacuum system is fluidly connected to the first fluid compartment for creating a vacuum within the first fluid compartment, the respective discharge port and the separator.

Preferably, the system includes a fluid transfer line connected to a first fluid compartment outlet of the first fluid collection compartment by means of a first fluid compartment outlet line. More preferably, the first fluid compartment outlet line includes a remotely controlled first fluid compartment outlet line valve for selectively closing off and opening the first fluid compartment outlet line.

Preferably, the system includes a second fluid collection compartment connected to a second discharge port for collecting the fluid expelled from the sorbent material wherein the second fluid collection compartment is air sealed and the vacuum system is fluidly connected to the second fluid compartment for creating a vacuum within the second fluid compartment, the second discharge port and the separator.

Preferably, the second fluid collection compartment includes a second fluid compartment outlet connected to the fluid transfer line via a second fluid compartment outlet line. More preferably, the second fluid compartment outlet line includes a remotely controlled second fluid compartment outlet line valve for selectively closing off and opening the second fluid compartment outlet line.

Preferably, the first discharge port is connected to the press collection cavity and the second discharge port is connected to the feed collection cavity.

Preferably, the system includes a vacuum partition between the press collection cavity and the feed collection cavity.

Preferably, the vacuum supply system includes a blower having a blower motor for generating the vacuum pressure, the blower including a vacuum port for connecting to a vacuum line and supplying vacuum pressure, and a blower port for connection to a positive pressure line for delivering positive air pressure.

Preferably, the vacuum line includes a vacuum relief line vented to the atmosphere via a vacuum relief port. Preferably the vacuum line and vacuum relief line include respective vacuum line and vacuum relief line valves for selectively closing off and opening the vacuum line and vacuum relief lines.

Preferably, the vacuum line and vacuum relief line valves, are configured complementary activation to directing of vacuum suction from the vacuum supply to either the separator via the vacuum line, or to the atmosphere via the vacuum relief line.

Preferably, the blower vacuum port is connected to a cyclone separator upstream for substantially removing solid and liquid matter prior to the blower.

Preferably, the system includes a control system including a computer or PCD, a user interface and a communications module for connecting the control system to the various separator system components by means of a communications network.

Preferably, the control system is adapted to operate the system components for centrally controlling the remotely controlled valves including the separator feed line valve; first and second fluid compartment outlet line valves; vacuum line and vacuum relief line valves; a motor and/or transmission for rotating the compression screw; and the blower motor.

Preferably, the control system is adapted to operate the system in predetermined operational modes.

Alternatively, the separator is a centrifuge separator or a rotary press separator.

Preferably, the loose solid material sequesters the pollutant by adsorption and/or absorption or other association.

Preferably, the loose solid material is a natural material, including earth, sand soil, organic matter, excrement, manure etc Preferably, the loose sorbent material, is presented in grains, pellets, beads and/or sheets or strips.

In another aspect, the invention provides a separator system for separating a mixture of one or more liquids and a loose, solid material, substantially into liquid and solid phases, the separator system including:
  a compression separator of the continuous screw press type having:
    an elongate compression chamber within which the mixture is compressed by means of a rotating compression screw, the compression chamber having a compression chamber wall including at least one filtration portion for retaining solid material under pressure while allowing fluid expelled from the compression chamber to pass through the filtration portion to escape the chamber;
    a mixture inlet connected to the compression chamber for introducing mixture into the separator; and
    a solids outlet allowing processed solid material to be ejected from the compression chamber;
  wherein said compression chamber is disposed within a substantially air sealed separator housing, said housing including a housing wall and at least an inlet and outlet opening corresponding to each of the mixture inlet and solids outlet; and wherein
  a vacuum supply system is fluidly connected to the housing for generating a vacuum within the compression chamber thereby enabling unprocessed mixture to be drawn through the inlet and into the compression chamber.

In another aspect, the invention provides a separator system for separating a mixture of one or more liquids and a loose, solid material, substantially into liquid and solid phases, the separator system including:
  a compression separator for separating liquid from the solid material by compression, the separator including:
    a separator housing having a housing wall defining a substantially air sealed housing interior;
    a compression mechanism including a mixture compression chamber located within the housing interior, the compression chamber having a compression chamber wall including at least one filtration portion for retaining solid material within the compression chamber under compression while allowing fluid expelled from the solid material to pass through the filtration portion into at least one fluid collection cavity disposed between the compression chamber and housing walls;
    a mixture inlet connected to the compression chamber for introducing mixture into the separator through the housing wall;
    at least one discharge port for discharging fluid from the fluid collection cavity;
    a solids outlet allowing processed solid material to be ejected from the compression chamber and housing; and
    a vacuum supply system fluidly connected to the housing interior for generating a vacuum within the compression chamber so as to draw unprocessed mixture through the inlet and into the compression chamber.

In another aspect the invention provides a plant for servicing a waste stream decontamination system, the decontamination system for removing one or more liquid or semi liquid pollutants from waste stream, the decontamination system comprising:
  at least one waste stream reservoir, the waste stream reservoir having at least one waste stream inlet for receiving the waste stream into the waste stream reservoir and at least one waste stream outlet for removal of decontaminated waste stream from the waste stream reservoir;
  at least one contaminant trap for removing the one or more liquid or semi liquid pollutants from the waste stream received into the waste stream reservoir, wherein the contaminant trap is configured to sequester one or more liquid pollutants within a loose, solid sorbent material within the containment trap; and
    wherein the plant includes:
    a separator system in accordance with the first aspect for separating the one or more liquid pollutants from the sorbent material;
    a liquid pollutants storage compartment for storing liquid pollutants separated from the sorbent material.

Preferably, the decontamination system includes at least one solids particulate trap in direct fluid communication with the at least one waste stream inlet for accumulating solid particulate material from the received waste stream; and wherein the plant includes:

a solids pollutants storage compartment for storing the solid particulate material and contents of the solids particulate trap.

Preferably, the vacuum supply is adapted for connection to the solids pollutants storage compartment to invoke a vacuum in said compartment for drawing the solid particulate material and contents of the solids particulate trap into the solids pollutants storage compartment.

In another aspect, the invention provides a method of extracting liquids from a mixture of one or more liquids and a loose, solid material, by squeezing and/or pressing the mixture in a separator or separator system as previously described wherein the method includes:

drawing the mixture into the separator by means of vacuum differential pressure via a separator feed line conduit;

applying pressure to the mixture in a compression chamber to expel the fluid form the solid material;

collecting the liquid;

ejecting the solid material from the compression chamber.

Preferably the method includes the further step of collecting the material ejected from the compression chamber in a hopper and pressurising the hopper with positive pressure air to force the solid material out an outlet of the hopper.

In any one of the above aspects and preferred embodiments, heating means may be provided for heating the mixture to increase fluidisation and/or liquidation and decrease viscosity of any liquids and semi-liquids in the mixture thereby aiding the separation process. For instance many greases and fats exhibit solid like properties at low temperature but become increasingly fluid at higher temperatures. Heating means may be configured to heat the mixture before it enters the compression chamber. In some embodiments the heating means may be incorporated into the inlet line so as to heat the mixture before it enters the separator. Alternatively or additionally, heating means may be configured to heat the mixture within the compression chamber.

Heating means may be disposed to heat fluid exiting the compression chamber within the collection cavities and/or within the collection tank.

The heating means may take a variety of forms known in the art including electric heating elements; gas fired heaters and other heating equipment such as heat pumps or heat exchangers drawing secondary heat from a internal combustion engine. The heating means may be configured to apply heat to or within any of the various system components including any one or more of the compression chamber walls, the housing, the compression screw, or the tanks so as to heat the mixture and/or fluids. Alternative or additional, heating means may be provided by hot air injection from a heating system.

The separator system of the invention may be used in a variety of applications requiring the separation of one or more liquids from one or more solid materials. Broad applications include sewerage and waste management; food production; agricultural, chemical and industrial processing and production; mining operations; recycling and refining and the removal of pollutants or contaminants either in solid or liquid form. Other separation applications include energy/biogas/biofuel processing, fracking and coal seam gas production; de-fluidising drill cuttings from borehole drilling operations, screenings; and clarifier sludge operations.

In one particularly common application, the system of the invention may be used in de-watering of a mixture. For example, the de-watering of bio-solids including municipal bio-solids, septage and/or animal manure for waste treatment; food waste dewatering; dewatering during meat and/or food processing; dewatering during pulp and paper processing and agricultural processing. It will be appreciated that in many applications, particularly de-watering applications, the liquid separated from the mixture will substantially comprise water and may include water based solutions, mixtures and/or suspensions.

In other applications however, the one or more liquids or semi-liquids may be, or have a base of other types of liquids including hydrocarbon based liquids such as oil, and/or alcohol based liquids. For instance, the press may be adapted for use for extracting alcohol solutions from soybeans, protein, pectin, and xanthan gum. Another common application is in seed oil production by squeezing the fat out of oil seeds, including but not limited to peanuts, sunflower seeds, canola (rape seeds); or in algaculture oil extraction.

Chemical processing applications include, but are by no means limited to, the production of ABS, sodium alginate and carrageenan, synthetic rubber, synthetic resin, hydrated polymer, naphthalene, elastomeric adhesive, colour film emulsion, and pharmaceuticals.

In many applications the solid and liquid components of the mixture are generally intrinsic, for instance, sewerage and animal waste includes both solid and liquid components which may require separation by "de-watering". Similarly, the extraction of oils and fats from oil seeds, the oils and fats are inherent in the seed.

In other applications however, a solid sorbent media may be introduced with the objective of "soaking up" by adsorption or absorption (sorption) the liquid from an environment, such as using a sorbent media for the sorption of liquids including oils and chemicals in a spills or the preferentially sorption of hydrocarbons or other liquids or liquid pollutants in an aquatic environment. In this way the liquid may be more conveniently withdrawn from the environment before being separated from the sorbent media. The sorbent media materials may consist of, or comprise natural materials such as cellulose materials. Regenerated celluloses comprising mixtures of various pulps and rayon; fibres comprising a synthetic polymer such as polypropylene, polystyrene, polyurethane, etc.; or sponges are mainly used and as adsorbents for fine oil droplets dispersed in water, synthetic fibres comprising a hydrocarbon polymer such as polypropylene, etc., may also used.

By way of example, one such application involves water remediation to remove pollutants from water waste stream, for example, water, sewage and waste water treatment plants, liquid treatment plants, lift stations, oily water separators, oily water interceptors, grease processing plants, fat processing plants, food production plants and facilities, tallow plants, etc. For instance, the separation system of the present invention may be useful for implementation in the waste water treatment method described with reference to the applicant's provisional application AU2016900851 filed on 8 March, 2016 and incorporated herein by reference. In this method, a solid, sorbent media is artificially introduced as a means to sequester liquid pollutants, particularly fats, oils and grease (FOG) from its surroundings (a waste water stream). In particular the waste stream is exposed to the solid sorbent material in a grease trap. The mixture of sorbent media and liquid then may be removed from the grease trap and waste water stream and processed to separate the liquid pollutant/s from the sorbent media.

Thus, in the above embodiment, the loose, solid sorbent media is artificially introduced and capable of removal of hydrocarbon based pollutants from a waste stream liquid into or onto the sorbent media. Thus a preferred sorbent media may capture the hydrocarbon based pollutants within the media, or may adsorb the hydrocarbon based pollutants onto the surface of the sorbent media therein.

For instance, with reference to the above application, preferably, the sorbent media capture and sequester the one or more pollutants in preference to any aqueous components present, typically water. Thus, in the case of hydrocarbon based pollutants, the one or more sorbent media are for example, oleophilic materials that preferential sorb hydrocarbon based pollutants over water or other aqueous fluids. Most preferred sorbent media for use in this application are simultaneously oleophilic and hydrophobic sorbent materials.

It will be further appreciated that preferably the sorbent media is selected based on preferential sorption properties. More preferably, the sorbent media is selected to have phillic properties with the liquid to be extracted and phobic properties with materials of the surrounding environment thereby encouraging, sorption of the liquid with the introduced sorbent media rather than sorption of any other matter.

In another aspect, the invention provides a method of decontaminating an environment of a liquid, the method comprising the steps of:

introducing a loose solid sorbent media capable into the environment to contact the liquid, said sorbent media capable of sequestering, for example, by adsorption and/or absorption or other association, the liquid from the environment;

recovering the sequestered liquid from the sorbent media by a separation process involving:

removing a mixture of the sorbent media and sequestered liquid from the environment and drawing the mixture into a solids/fluids separator by differential vacuum pressure;

extracting the liquid from the sorbent media by squeezing and/or pressing the mixture thereby separating the liquid from the sorbent media.

Preferably, the separation process is performed by a separator, separator system or plant as defined in any one of the previous aspects.

The environment may be a natural, a man-made or an artificial environment for instance, an environment created by mining or manufacturing either open or contained, or semi-contained. By way of example, the environment may be contained in a manufacturing or processing operation within a reservoir or container, or maybe semi-contained such as within a dam. The environment may be a non liquid or dry environment or a liquid environment. Preferably, the liquid environment is water based including an aquatic environment.

Preferably the water based environment is a waste water waste stream from a domestic, industrial and/or commercial sources, preferably restaurants, laboratories, residential estates, and/or hospitals, car washes and/or oily water separators. More preferably the water based environment is a grease trap.

The liquid may be a liquid pollutant material or compound which contaminates the environment including inorganic based pollutants, organic based pollutants, microbial pollutants, and combinations thereof. It will be appreciated that inorganic based pollutants include heavy metals, such as cadmium, mercury, lead, and arsenic; inorganic sulfides, such as hydrogen sulfide; inorganic acids such as sulphuric acid, silicon based pollutants, etc. It will be further appreciated that organic pollutants include organic compounds including organic acids, ethers, esters, ketones, organic salts, etc., hydrocarbon based pollutants including fats, oils, greases, petroleum compounds including volatile organic compounds such as benzene, xylene, toluene, etc., pesticides; herbicides; drug actives and/or metabolites, dissolved gases such a methane. Preferably, the hydrocarbon based pollutants includes fat, oil, and grease from food preparation or cooking sources.

Preferably, the sorbent materials preferentially sequester, for example, by adsorption and/or absorption or other association, the liquid from the environment. More preferably in the case of a water based environment, the sorbent media has oleophilic and more preferably oleophilic and hydrophobic sorbent properties.

Preferably the method further comprises the step of returning new or recycled one or more pollutant sorbent materials to the environment.

By 'loose, solid material', 'loose, solid sorbent material', 'loose, solid media and 'loose, solid sorbent media it is meant one or more materials that are solid but composed of small, discrete entities as opposed to being continuous or monolithic. Reference to a 'solid' material should be regarded as referring to a loose, solid material unless otherwise stated.

By 'sorbent materials', it is meant that the one or more materials that are capable of the sorption of a liquid by adsorption and/or absorption onto and/or within the sorbent material. The sorbent material may be an intrinsic solid component of a mixture of solid and liquid material. Alternatively, the sorbent material may be a sorbent "media" introduced for the sorption of a liquid from dry or "other" liquid environments such as a contacted waste stream liquid.

By 'liquid', it is meant a substance that has liquid properties and easily deforms and will flow under the applied shear stress of its own mass. Liquids may include quasi-liquid, semi-liquids, flowable gels or the like. Liquids may also be a mixture of liquids in solution or suspension and/or contain dissolved or suspended matter.

By 'pollutant', it is meant, a material or compound which contaminates a liquid including inorganic based pollutants, organic based pollutants, microbial pollutants, and combinations thereof. It will be appreciated that inorganic based pollutants include heavy metals, such as cadmium, mercury, lead, and arsenic; inorganic sulfides, such as hydrogen sulfide; inorganic acids such as sulphuric acid, silicon based pollutants, etc. It will be further appreciated that organic pollutants include organic compounds including organic acids, ethers, esters, ketones, organic salts, etc., hydrocarbon based pollutants including fats, oils, greases, petroleum compounds including volatile organic compounds such as benzene, xylene, toluene, etc., pesticides; herbicides; drug actives and/or metabolites, dissolved gases such a methane. Preferably, the hydrocarbon based pollutants include fats, oils, and greases from food preparation or cooking sources. The term 'pollutant' is thus not necessarily exclusively limited to waste materials or compounds without value or utility and may include materials recovered from the waste stream with commodity.

By 'recyclable sorbent material' or 'recyclable sorbent media, it is meant that a sorbent material or media that can be treated to remove sequestered liquids and reused.

By 'waste water' or 'waste water stream', it is meant a waste stream liquid is, predominantly water, for example, a waste water run off, for example, from an industrial plant, such as a chemical manufacturing, processing or treatment plant including plastics plant, a pharmaceutical, pesticide or herbicide plant, domestic, industrial, commercial facilities, including restaurants, food preparation and/or businesses, agriculture, sewers and stormwater or waste "water" from mining operations including drilling and fracking operations.

By 'vacuum', it is meant a partial vacuum, or a pressure lower than atmospheric or a pressure gradient used to create a suction or blowing flow. It does not imply a perfect vacuum.

By 'vacuum sealed', it is meant that a body, and particularly a receptacle, tank or housing, is sealed to the extent that it may substantially retain and direct a vacuum (or positive pressure) on application of a vacuum supply (or positive pressure) from a vacuum (or positive pressure) inlet to an outlet without significant, inadvertent loss of pressure. As used herein, unless otherwise stated, the term does not imply a perfectly imperviously sealed body.

It will be appreciated that some fluid/s will be retained in the solid material after the separation process. That is to say the separation process will generally not extract 100% of the fluid/s from the mixture. The amount of fluid remaining within the solid matter after processing will depend upon a range of factors including the material being processed and the fluid and, the design specifications of the separator. In this regard the term 'separating a mixture of one or more liquids and a loose, solid material, substantially into liquid and solid phases' is intended to provide indication that the degree of separation into liquid and solid phases should be taken in the context of the specific application and design of the separator. Preferably however the fluid content in the processed solid material is less that 15% by weight, more preferably less that 7% by weight and most preferably less than 3% by weight.

BRIEF DESCRIPTION OF THE DRAWINGS

The invention will be more clearly understood from the following description of an embodiment thereof, given by way of example only, with reference to the accompanying drawings, in which: —

DETAILED DESCRIPTION OF A PREFERRED EMBODIMENT

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

Figure 1:
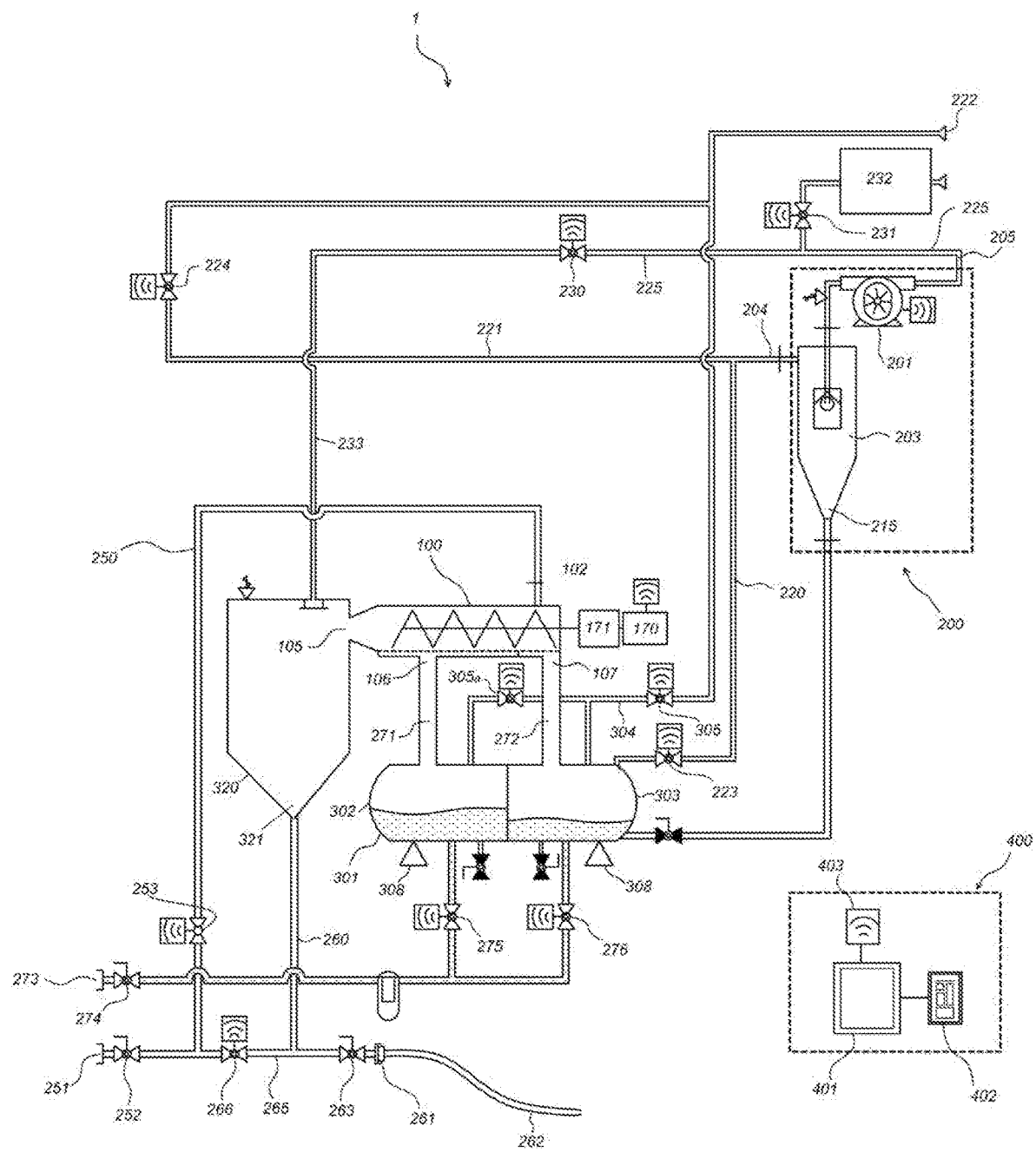
FIG. 1 is a schematic view of one embodiment of a separator system in accordance with the invention.

Referring now to the drawings and initially schematic illustration in FIG. 1, in broad terms the invention, being in particular a separator system 1 for separating a mixture including said one or more liquids or semi-liquids and a loose, solid material, includes the components of: a compression separator 100 for separating the liquid from the solid material by compression; and a vacuum supply 200 for generating suction to draw mixture into the separator via a feed line.

The compression separator 100 includes a compression mechanism for applying direct mechanical and/or inertial pressure to the solid material for the extraction or desorption of the liquid. The compression mechanism includes a compression chamber within which the mixture is compressed. At least one filtration screen in the compression chamber wall retains solid material under pressure while allowing fluid expelled from the material to pass through the screen for collection.

The invention preferably includes one or more of, a network for conveying material into and from the separator, a fluid capture system 300 for collecting fluid and a control system 400 for controlling the separator.

Figure 2A:
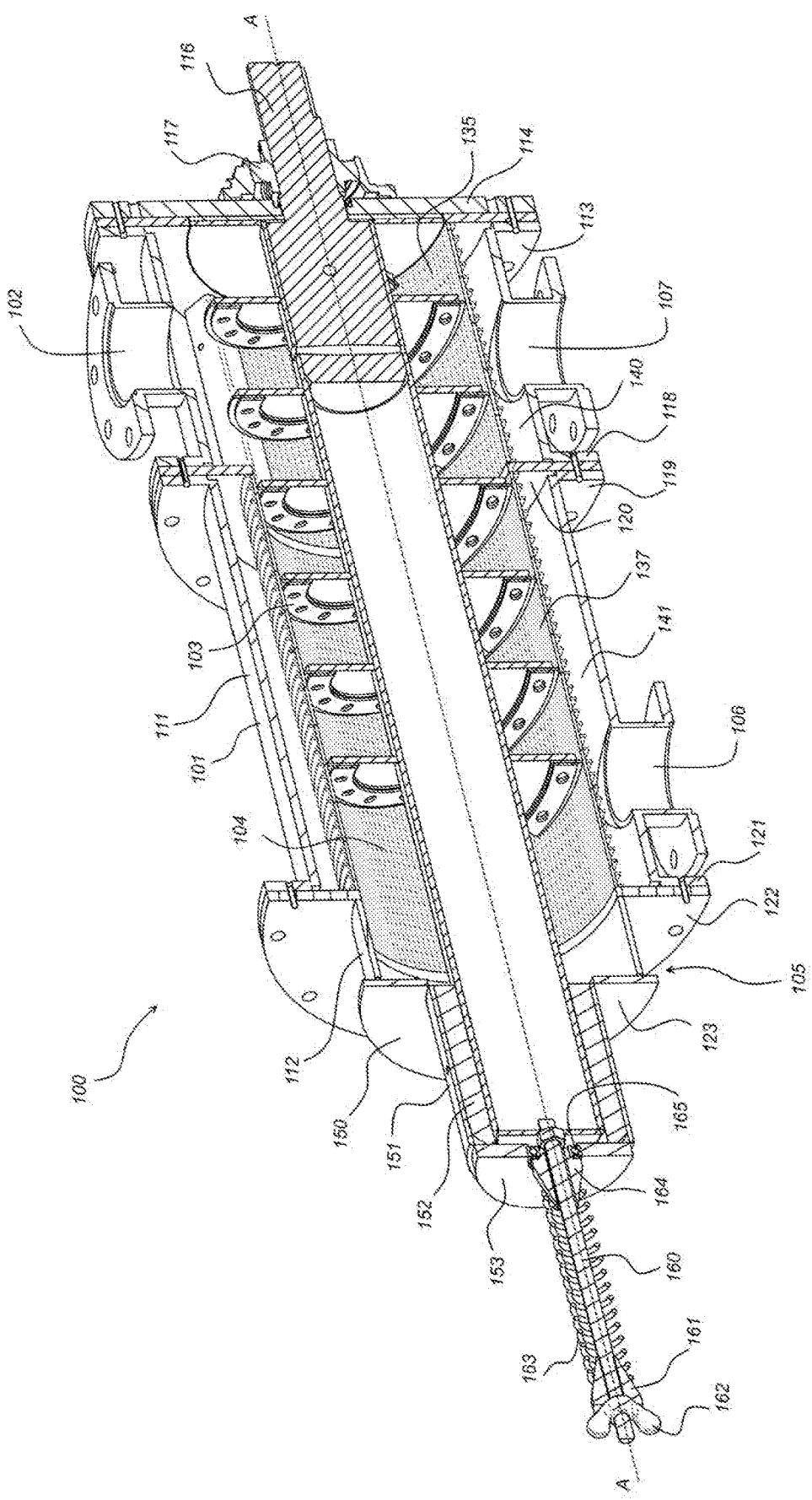
FIG. 2A is a detailed perspective section view of a screw press separator in accordance with the invention.
Figure 2B:
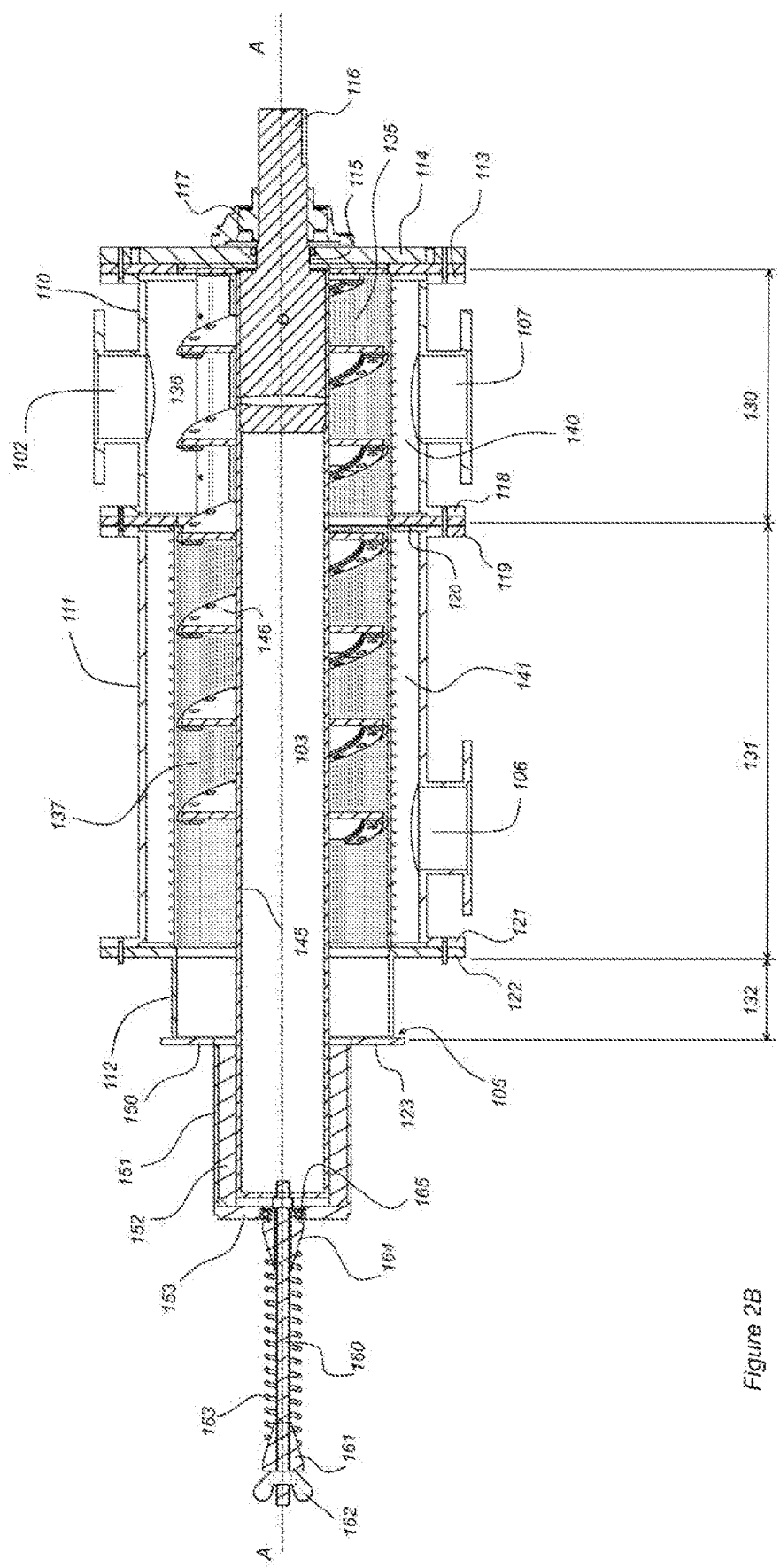
FIG. 2B is a front section view of the screw press separator shown in FIG. 2A.

Detailed, section views of the compression separator 100 in accordance with a preferred embodiment of the invention are shown in FIGS. 2A and 2B. Separator 100 is a continuous screw press separator including an elongate cylindrical compression chamber at least partially disposed within a substantially air sealed housing 101. The housing is connected to the vacuum supply 200 via at least one vacuum line, the vacuum supply invoking a vacuum within said housing so that mixture for processing may be drawn into the press through an inlet 102, under suction Located within the housing, and coaxially disposed along axis A-A, is a compression screw 103 mounted for close fitting rotation within the elongate cylindrical compression chamber 104. Unprocessed mixture from inlet 102 is directed into the compression chamber 104 at an upstream end of the press where it is advanced though the press and compacted by the auger/compression screw and a "choke" mechanism toward a downstream end. The compression chamber 104 includes a compression chamber wall having filtration portions to allow fluids expelled from the mixture under pressure to escape the compression chamber while retaining solid material within. The processed solid material, substantially fluid free, is discharged at solids outlet 105 disposed at the downstream end. At least one discharge port is provided for the release of extracted fluids from the separator housing and connection of the vacuum supply. Fluid discharge and vacuum connection may be through the same or separate ports. As shown in FIGS. 2A and 2B discharge port 106, is primarily provided for the release of extracted fluids from the separator housing 101 while a vacuum port 107 allows connection of the vacuum supply. However as will be seen, in this embodiment, both ports provide degrees of vacuum and fluid discharge functions.

The continuous screw press may take a variety of forms as are known in the art. That is to say the screw press may include for instance, any combination of but not limited to, an increasing shaft diameter screw press; a reducing screw pitch screw press; converging compression chamber screw press; a cone screw press; a twin-screw press or a back-pressure type screw press, or a screw press including any number of known innovation including for instance an interrupted screw. However, in this embodiment, the screw press is a cylindrical, regulated outlet type screw press whereby the discharge of solids from the chamber is controlled or regulated by a solids outlet regulator. In this embodiment the solids outlet regulator is in the form of a door choke member biased into a closed position by a biasing arrangement.

Referring to FIG. 2B, in this embodiment, the press includes feed, press and outlet sub-housings (110, 111, and 112). Each sub-housing is formed of a tubular section and configured for axially aligned, connection by means of respective laterally extending connection flanges. It will be noticed that in this embodiment the diameter of the feed and press sub-housing is larger than the diameter of the outlet sub-housing, such that the outlet sub-housing forms a portion of the elongate compression chamber wall.

The feed and press sub-housings (110 and 111) include end flanges positioned at respective opposite, upstream and downstream ends, while the outlet sub-housing 112 includes an end flange only at the upstream end. The connection flanges allow for attachment to either an adjacent connection flange of the adjoining housing, or an appropriate bulkhead plate by means of appropriate threaded fasteners (not shown) extending through circumferentially spaced, aligned apertures through each respective flange. Preferably the threaded fasteners are in the form of bolt and nut pairs and allow the separator housing to be opened to replace, repair, or inspect parts and internals and/or swap over parts of different specifications.

With reference to FIG. 2B, at the upstream end of the press, an upstream end connection flange 113 of the feed sub-housing is bolted to an upstream end bulkhead plate 114 generally sealing off the upstream end of the housing. A central bore 115 in bulkhead plate 114 allows a stub axle 116 of the compression screw 103 to extend out of the press for engagement with appropriate drive means. The stub axle 116 is rotatably mounted by means of thrust bearing 117 to the bulkhead plate 114 thereby enabling rotation of the compression screw 103 with respect to the housing and compression chamber 104. As will be seen axial thrust generated by the compaction of the screw 103 is passed to the bulkhead plate 114 and in turn to the housing.

A connection flange 118 at the opposite end of the feed sub-housing 110 or the downstream end, is bolted to an upstream end connection flange 119 of the press sub-housing 111 via an intermediate annular vacuum baffle plate 120, the function of which will be described below. A downstream end connection flange 121 of the press sub-housing 111 is bolted to the upstream end connection flange 122 of the outlet housing 112. A peripheral rim of the downstream end of the outlet housing 112 defines the solids outlet 105 against which a "hat shaped" choke member 123 is biased.

In addition, the housing includes at least one aperture through the housing wall to form ports into and out of the housing. For instance in this embodiment, the press housing 111 includes an aperture through a lower portion of the press sub-housing wall to form a first discharge port 106. Feed sub-housing 110 includes an aperture through an upper portion of the feed sub-housing wall to form inlet 102, and second aperture through a lower portion of the feed sub-housing wall to form vacuum port 107. Each inlet and outlet includes a throat formed of a smaller diameter cylindrical tube section and an attachment flange for connecting the inlet/outlet to a respective conduit, line or pipe.

Of course the housings are not limited to this particular construction. For instance, the flange and fastener attachment system may be replaced with a bayonet locking mechanism to allow for convenient connection and disconnection thereby providing easier access to the compression chamber. Alternatively, in other embodiments two or more sub-housings or housing segments are hingedly connected. In still other embodiments, the housing may be formed from an assembly of segments either longitudinally or laterally divided or a single tubular section. Furthermore, as will be described, the housing may form a holding tank for collecting fluid extracted by the separator.

Turning back to the embodiment shown in FIGS. 2A and 2B, each of the feed, press and outlet sub-housings (110, 111, and 112) generally define respective feed, press and outlet zones of the compression chamber which for ease of reference are indicated in FIG. 2B as feed, press and outlet sections (130, 131 and 132). The feed section 130 of the compression chamber 104 is located at the upstream end of the press and as previously noted, sealed by bulk head plate 114. The mixture suctioned into the press through the inlet 102 is delivered into the feed section 130 before being pushed into the press section 131 of the compression chamber 104 by the auger effect on rotation of the screw 103. In the press section, the mixture compacted and compressed to expel liquid through the filtration portion wall, before the mixture is pushed into the outlet section 112 and toward the outlet. The solids outlet 105 at the downstream end of the press is closed off by a choke member 123 biased into a closed position.

The compression chamber 104 is cylindrical with a uniform cross-section and sized to correspond closely with the shape and diameter of the screw 103. In this embodiment as illustrated, it will be noticed that the internal surface of the tubular outlet sub-housing forms an impermeable tubular wall of the outlet section of the compression chamber 104, the walls of the compression chamber in the feed and press sections (130, 131) are spaced internally and distinct from the walls of the respective tubular feed and press sub-housings. These walls of the feed and press sections of the compression chamber are largely formed of the filtration portions which allow fluids expelled from the mixture under pressure to escape the compression chamber while retaining solid material within.

In this embodiment, the filtration portion of the feed section 130 of the compression chamber wall partially surrounds the screw 103 to form a strainer basket 135 for receiving unprocessed solid/liquid mixture. The basket is shaped as a truncated tube cut by a flat plane parallel to the tube axis where so as to provide a basket wall of arcute cross-section. Preferably, the basket cross sections provides a circumferential arc of more than 180° and more preferably of more than 220° of the tube.

The lower portion of the basket 135 is positioned over and shields the vacuum port 107 while an open top 136 of the basket 135 is positioned adjacent the inlet 102 allowing the mixture to enter the compression chamber. In this way, the basket 135 provides a filtering barrier between the compression chamber 104 and the vacuum port 107 so that solids suctioned into the feed section 130 of the compression chamber are substantially prevented from being sucked straight out again into the vacuum port 107. Preferably a deflection surface is provided to prevent material sucked into the compression chamber at high velocity impacting directly against the screen at the bottom of the basket. In this embodiment, it will be noted that the shaft of the compression screw passes through the inlet section directly under and in line with the inlet to intercept and deflect the high velocity material. At the upstream end of the press, the basket end is sealed against the bulkhead 114. In other embodiments the basket may be in the form of a tubular cage having a single opening positioned adjacent the inlet. In other embodiments, the inlet section of the compression chamber may have solid impermeable walls without a filtration portion similar to the walls of the outlet section. In such embodiments, the inlet section only serves to receive the mixture into the compression chamber before it is passed into the press section.

The filtration portion which forms the walls of the press section 131 of the compression chamber substantially surrounds the circumference of the compression chamber thereby forming an open ended tubular strainer cage 137. One end of the cage 16 abuts the strainer basket 135 in the feed section 130 while the other end of the cage 137 is sealed against the outlet housing 112.

The strainer basket and cage (135, 137) are each formed as a grid of axially extending parallel strainer rods held together in circumferentially spaced relationship by surrounding supporting rings or arc ribs, which may be of annular or spiral form. The rings and arc ribs are supported by axially extending support bars which engage and transmit forces including expansion and torsion forces generated by the compression screw, to the housing. The spaced relationship of the axially extending parallel strainer rods provide a circumferential array of axially extending parallel apertures or channels which allow liquids to pass out of the chamber while holding back solid material.

While the basket and cage in this embodiment are formed substantially as respective single pieces, in other embodiments the basket and cage may be comprised of two or more segments, split longitudinally or laterally. In other embodiments the basket and cage may be integrally formed rather than separate parts.

The longitudinal extending rods and channels which form the inner surface of the cage and basket act as axial rails tending to inhibit movement of material circumferentially around the chamber while allowing comparatively free movement axially which tends to aid the auger action provided by the screw. It will be appreciated the width of the channels or "gauge" of the screen must be pre selected according to the particle size of the loose solid material being processed so as to retain the solid material within the compression chamber under compression. However such considerations are generally well known in the art.

As noted above, the strainer basket and strainer cage (135, 137) are spaced from the surrounding housing wall. The space between the screens and chamber walls form fluid collection cavities (140, 141) each respectively partially surrounding and fully surrounding the feed and press sections of the compression chamber for collecting and channelling fluid passing through the filters.

The feed collection cavity 140 is disposed generally adjacent and under the screen basket 135 above the vacuum port 107. The press collection cavity 141 which surrounds the cage 136 and press section 131 of the compression chamber is annular in shape and extends between ends of the press housing. The two collection cavities are divided from one another by the annular plate 120 forming a vacuum partition. It will be appreciated that fluid collected in the press collection cavity 141 may drain via gravity from the press via the first fluid discharge port 106 while the vacuum port 107 allows release of fluid from the feed collection cavity 140. In this way the vacuum port 107 also functions as a second fluid discharge port.

The vacuum partition 120 directs suction applied by the vacuum system through the vacuum port 107 to draw through the basket, and inlet 102 rather than from the forward part of the compression chamber or the press collection cavity 141. Furthermore liquids are prevented from flowing between the two collection cavities.

In another form of the invention the vacuum port may be relocated and configured solely as a vacuum port forming no function to allow the discharge of fluids. In such embodiments the vacuum port may be relocated to the side or top of the press.

Figure 2C:
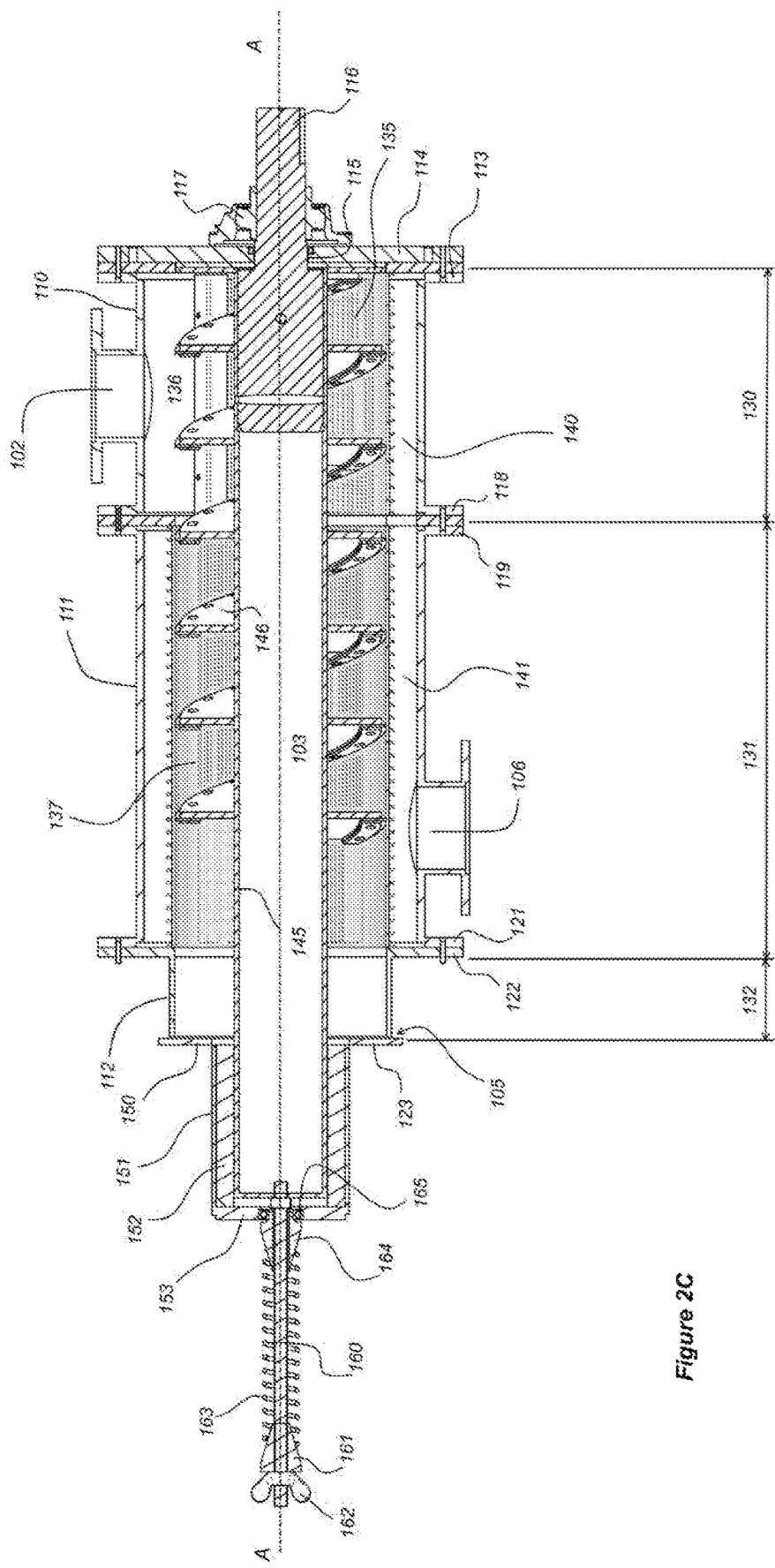
FIG. 2C is a front section view of an alternative form of the screw press separator shown in FIG. 2B.

In still further embodiments as shown in FIG. 2C, the discharge port 106 serves as both the fluid discharge port and the vacuum connection port and the feed and press collection cavities are joined to form a single collection cavity. This vacuum pressurises the collection cavity around the cage portion of the compression chamber at the press section so that vacuum pressure also acts to draw fluid into the press and through the strainers thereby aiding the separation process. In this case, port 107 is omitted.

The compression screw 103 includes a hollow screw shaft 145 on which spiral screw vanes 146 are affixed. The screw shaft 145 receives and is directly supported on the stub axle 116 at the upstream end of the press by bearing 117. The vanes 146 have an outer diameter corresponding closely to the inner diameter of the compression chamber 104 so as to provide the screw with sufficient clearance to turn within the compression chamber while substantially preventing material moving back in the chamber between the vanes and the chamber walls, against the auger motion of the screw. The downstream end of the screw floats with the compression chamber.

The pitch and diameter of spiral vanes 146, the diameter of shaft 145, and the length of the press are parameters which may be selected in accordance with the material to be pressed, the characteristics of the liquids to be expressed, the volumes of material to be handled, and the throughout required. For instance, in one form the screw press compression chamber has a diameter of approx 350 mm, and a length of 1200 mm.

In this embodiment, the spiral screw is a single vane, constant pitch screw. In this embodiment the vanes extend from the upstream end of the compression chamber to end approximately between one half and three quarters the length of the press section of the compression chamber. As will be seen this so that the mixing action of the vanes do not interfere with the formation of a "plug" of material in the outlet portion and the end of the press portion which enhances backpressure within chamber. In this embodiment the spiral screw is formed predominantly of steel and more particularly stainless steel. However other materials and metals may be used such as aluminium, depending on a range of factors including the operational compressive force required for extraction and the nature of the materials being separated.

The outlet 105 of the compression chamber is annular in shape and defined by the peripheral rim of tubular outlet housing 112 and the compression screw shaft which extends from the compression chamber beyond the outlet.

The choke member 123 includes an annular cover plate 150 having an outer diameter suitable to cover and close off annular shaped outlet 105 thereby forming the door of the choke. The plate is mounted coaxially on the screw shaft 145 for rotationally and axially slidably movement by means of tubular choke member support sleeve 151 which surrounds the screw shaft 145. A press-in bushing 152 allows the annular cover plate 150 and sleeve to freely "float" on the shaft, while substantially sealing between the tubular support sleeve 151 and the screw shaft. The axial sliding movement along the shaft enables the choke member 123 and specifically cover plate 150 to move between a closed position where by the plate is seated against the peripheral rim of tubular outlet housing 112, to close the solids outlet and prevent ejection of solids from the separator, and an open position spaced from the peripheral rim allowing solid material to be ejected from the separator.

A biasing arrangement is configured to bias the choke member 123 and annular cover plate 150 toward the closed position thereby providing a counter pressure against the solid material exiting the outlet. To this end, an end cap 153 joined to the distal end of the sleeve 151 opposite the annular cover plate 150 includes a central aperture allowing the choke member 123 to be threaded over a threaded tension rod 160 coaxially aligned with, and extending from the end of the screw shaft. The screw shaft 145 includes an end plate sealing off the hollow end of the shaft to which the threaded rod 160 is fixedly mounted. At the opposite, distal end of the rod 160 a distal spring retainer 161 and rod 160 engaging threaded wing-nut 162 are positioned to provide a distal stop for bias spring 163 which acts against the end plate 152 via rod mounted proximal spring retainer 164 and bearing 165.

The bias spring 163 provides a bias to hold the choke member 123 and particularly the annular cover plate 150, against the press outlet 105 in the closed position. The threaded nut can be wound along the threaded rod to provide for spring tension adjustment to vary the bias force holding the choke against the outlet 105. In this way the door choke is supported by and mounted for relative rotational and axial movement to the end of the screw shaft 145, while being biased to engage the peripheral rim of tubular outlet housing 112.

It will be appreciated that the resistance offered by the choke member provides a counter-pressure to hold material within the compression chamber which initiates the formation of a blockage or "plug" of solid material providing a choking mechanism and additional resistance within the outlet section of the compression chamber. As more material is forced toward the outlet by the screw, pressure in the material in the chamber increases until the bias holding the choke member closed is overcome so that the choke member slides axially on the shaft 145 away from the closed position in contact with the peripheral rim of tubular outlet housing 112, to an open position whereby material may be ejected from the chamber thereby releasing pressure from the chamber.

As noted, a measure of adjustment of the bias force holding the door choke in the closed position is provided by winding the threaded nut along the threaded shaft in either direction to control the amount of spring tension. The greater the bias force holding the choke closed, the greater the counterpressure provided by the choke member and compressive force within the chamber required before the choke member will open to relieve pressure. If additional adjustment is required beyond the range provided by movement of the threaded nut, the spring may be swapped out for a different spring of higher or lower spring constant. Typically the force exerted by the spring to hold the choke closed is around 5-200 kg (approximately 50-2000N).

It will be appreciated that the choke member 123 as described above may be replaced with other counter pressure mechanisms as are known in the art. These include hingedly attached flaps, segmented flaps and flexible segmented diaphragms.

It will be appreciated that depending on the particular application, and the nature of the mixture being separated, the operator is able to make running operational adjustments to the device such as varying the operating speed of the screw, the rate of feed of material and the vacuum force used, and perhaps the bias force applied to the choke. Further adjustment of operational characteristics may be made by unbolting the sub-housing/s and swapping over various components to others of difference specification. For instance, the screens compression screw may be "swapped out" for ones of different specification. The screens may be replaced with screens of a different strainer gauge to correspond to the particle size of the solid material, and/or the screw may be changed to one having different specifications (shaft diameter, shape, size and number of screw vanes etc).

Furthermore, the invention may employ other designs of continuous screw press separators in place of the screw press described above and shown in FIGS. 2A and 2B. For instance, the screw press may be embodied as an expeller type screw press, an interrupted screw type press or a twin screw type press.

Other components of the system will now be described with reference to FIG. 1.

As noted above, the compression screw shaft is connected, by means of stub axle 116, to rotational drive means comprising a drive motor 170 and transmission 171 for engaging/disengaging drive to the compression screw and controlling its rotation speed within the screw press. In this embodiment the drive motor and transmission are hydraulically operated. The rotational drive means is connected to and controlled by the control system. Rotational speeds of between 20 rpm and 60 rpm are typical but it will be appreciated that the operational rotational speed will be dependent on factors including, the design of the separator, the material being processed and the rate of delivery of material into the press.

As shown in FIG. 1, each of the at least one fluid discharge ports (106, 107) are connected to a fluid collection tank 301. In this embodiment a single fluid collection tank includes separate first and second compartments (302, 303) allowing for fluid discharged from first fluid discharge port 106 to be isolated from the fluid discharged from the second discharge port 107. Each compartment may be selectively vented to the atmosphere by means of venting line 304 and valves 305 and 305*a*. Similarly, each compartment is provided with manually operated tank drain valves (306, 307).

The tank 301 is mounted on a load cell system 308 to monitor weight as fluid is added to or drained from the tank thereby providing data indicative of the amount of fluid collected. Preferably the load cells are connected to the control system 400 to enable monitoring of the mass of fluid within the tank. Separate volume and corresponding measuring/indication means may be applied in addition to or in place of the load cell system. Alternatively, the tank inlets and outlets may be fitted with flow metering equipment to measure the flow rate of liquid entering and/or exiting the tank. By way of example, with reference to the embodiment shown in FIG. 6, the tank is a single fluid collection tank having separate first and second compartments.

The invention is not limited to the particular configuration of tank system displayed. For instance, it will be appreciated that the two compartments, single tank 301 may be replaced with separate tanks. Alternatively, each of the fluid discharge ports may be directed to a single compartment tank or a single compartment of a multi-compartment tank.

Figure 3A:
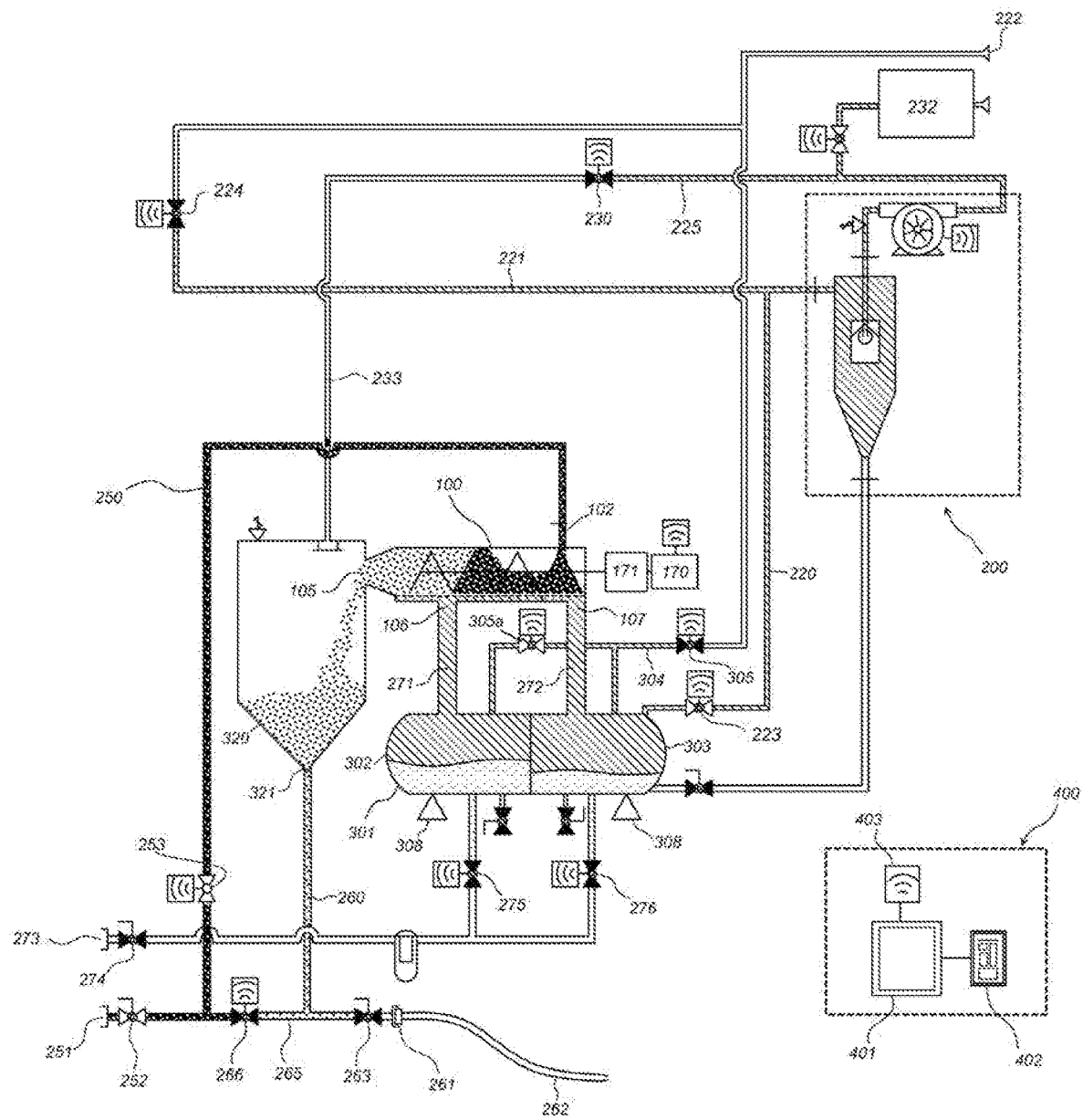
FIG. 3A illustrates the system of FIG. 1 operating in a first mode of operation.
Figure 3B:
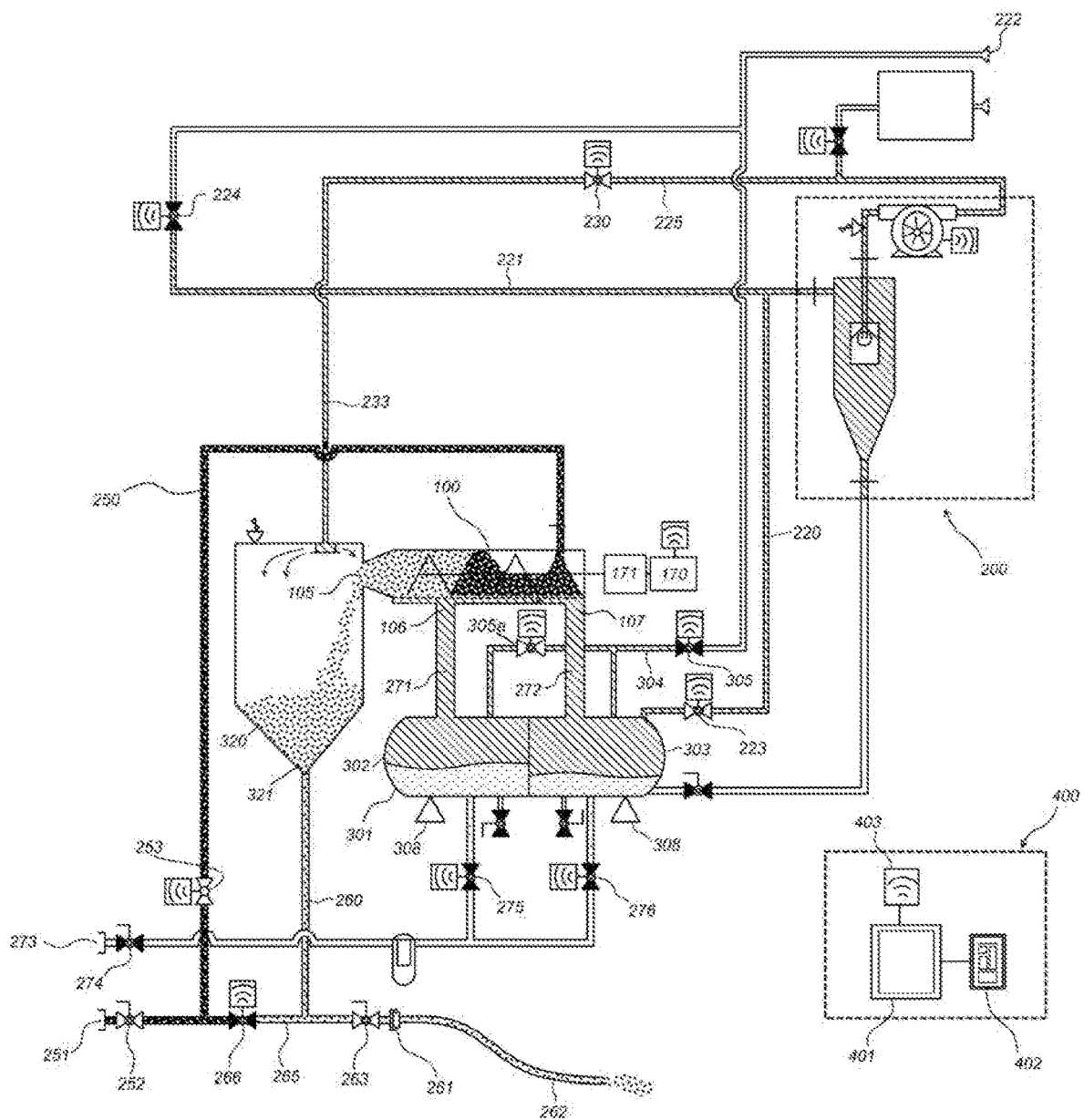
FIG. 3B illustrates the system of FIG. 1 operating in a second mode of operation.
Figure 3C:
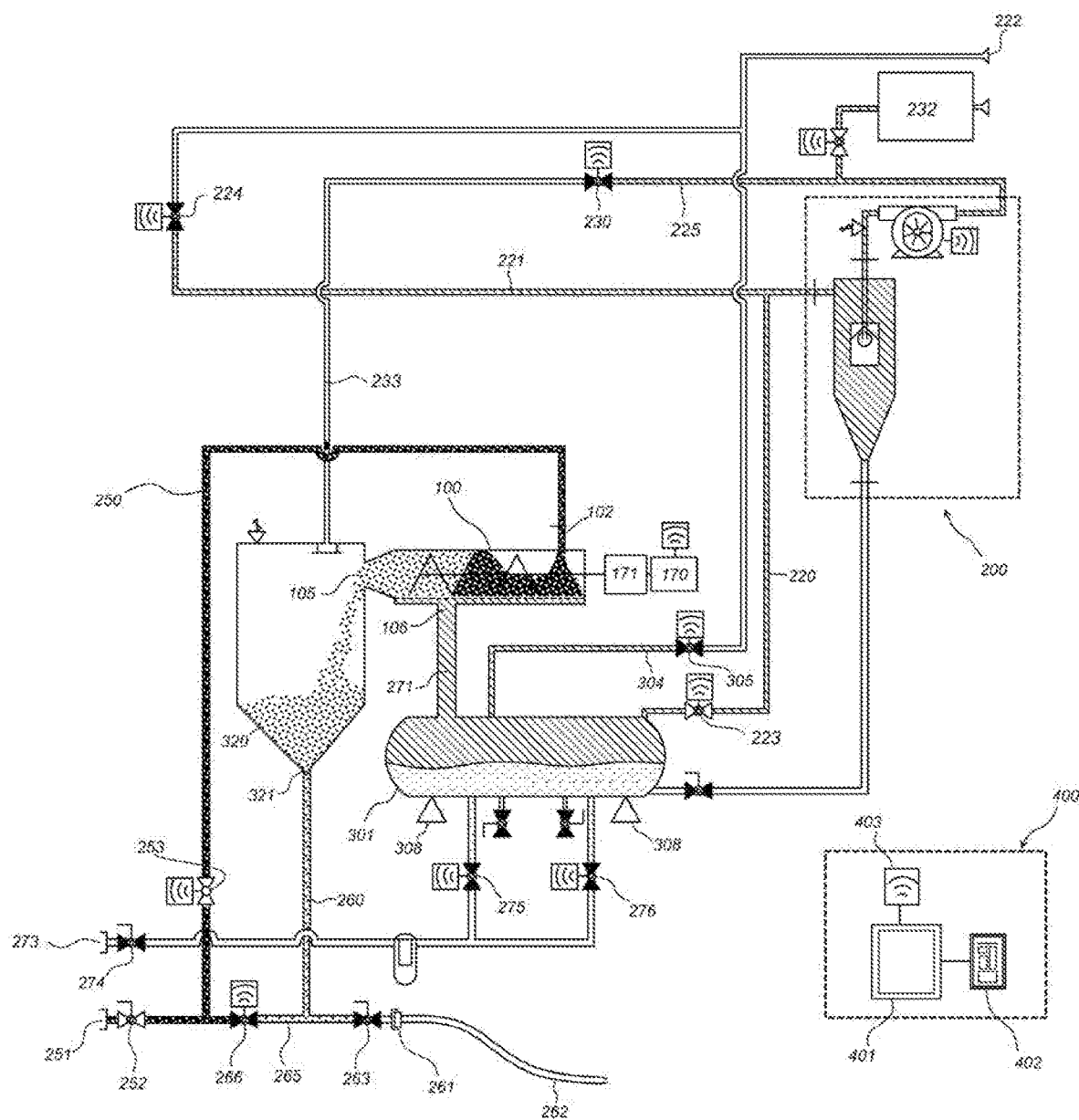
FIG. 3C another embodiment of a separator system in accordance with the invention, incorporating the screw press separator shown in FIG. 2C.

FIG. 3C shows a schematic view of the separator of FIG. 2C installed into a separator system 1 comprising a single tank 301 having a single compartment. In this configuration, the fluid discharge port 106 acts as a vacuum port via the tank 301.

In still further embodiments, the tank 301 and/or compartments 302 and 303 may be individually or collectively connected to a larger storage tank or fluid network.

Returning to FIG. 1, in this embodiment, the solids outlet 105 of the screw press opens into a sealed solids collection hopper 320. The hopper includes a generally vertical hopper wall including a lower converging section for funnelling solids to a bottom hopper outlet 321. In this embodiment, a portion of separator housing, being the outlet sub-housing portion, extends into the hopper at an upper portion of the hopper wall. In particular, the upstream end attachment flange 122 of outlet sub-housing is connected and sealed to hopper wall thereby providing a seal between the hopper and the separator housing. In this way solid material discharged from the separator outlet falls into the hopper and is funnelled toward the hopper outlet.

As will be seen, in a first mode of operation of the system 1, the hopper 320 acts as a storage receptacle for sorbent/solid material discharges from the separator 100. In another continuous mode of operation, the hopper is used as a feed chute to funnel solid material to hopper outlet 321, from which the solid material is discharged relatively immediately. If the system is designed to store the solid material and operate in the first mode of operation, the hopper may be of a size necessary to store an accumulation of solid material, however if the system is primarily designed to run in the continuous mode whereby the solid material does not accumulate in the hopper, the tank may be of a substantially reduced volume. By way of example, with reference to the embodiment shown in FIG. 6, the system may be operated in either mode and as such the hopper 320 has a volume of around 500 litres.

In further embodiments, depending upon application, solid material discharged from the separator is simply allowed to fall by gravity from the separator. An appropriate open topped receptacle may be placed under the outlet to catch and collect the falling solid material, alternatively, the separator may be configured to discharge the solids material to a receptacle external of the separation system or it may be allowed to accumulate where it falls on the ground. In such cases, the hopper is not required nor is there a need for the receptacle to be vacuum sealed.

As previously noted, the system relies on differential pressure from the vacuum supply system to draw the mixture into the vacuum sealed separator. Accordingly, the vacuum supply 200 comprises a blower 201, a blower drive motor 202, an inline cyclone filter 203, and vacuum and positive pressure supply ports 204 and 205. A network of vacuum supply and positive pressure lines are connected to the vacuum supply port 204 and positive pressure supply port 205 so as to deliver suction or positive pressure to the system as required.

In this embodiment, the blower is positive displacement blower which is driven by an appropriate motor, however other types of blowers and/or vacuum supply systems may be used such as centrifugal, radial or side channel blowers or a vacuum pump. While the embodiment shown in the figures uses a single blower to provide both the vacuum and positive pressures, in other embodiments, vacuum and positive pressure may be provided by different blowers or differential pressure apparatus. For instance, by way of example only, with reference to the embodiment shown in FIG. 6, the blower is a Eurus Model 4506 positive displacement blower belt driven by a three cylinder, 35 hp diesel motor. The motor and blower are connected to and controlled by the control system which regulates blower speed and suction/positive pressure. Preferably the vacuum system is able to generate differential vacuum pressures of up to 50 kPa and more preferably greater than 50 kPa. Preferably the vacuum system is able to generate differential positive pressures of around 100 kPa and more preferably above 100 kPa.

The cyclone filter 203 is of a capacity matched to the blower and is connected directly with blower on the vacuum side. Thus the cyclone filter removes foreign objects, mainly solids and liquids, from the airflow through vortex separation in order to prevent them being ingested by the blower. The cyclone filter also includes a ball float overflow safety shut of valve, and a vacuum safety relief valve is included in the vacuum line between the cyclone and blower to provide a secondary safety shut down system in case of blockage of one of the ports or lines. A cyclone filter drain 215 is connected to the outlet of the cyclone filter to allow for selective removal of material trapped by the cyclone filter. Typically the cyclone filter has a volume of between 50 and 500 litres and by way of example, the cyclone filter 203 shown in the embodiment of FIG. 6, has a volume of 200 litres.

Vacuum supply port 204 is connected to main vacuum line 220 which connects the vacuum supply 200 to the separator via the fluid collection tank 301. In this embodiment specifically, the main vacuum line 220 is connected to the second compartment 303 of the collection tank so as to draw through the second discharge port/vacuum port 107 and feed collection cavity 140. However by opening the venting valve 305a between the first and second compartments while valve 305 is closed, the pressures in compartments 302 and 303 will substantially equalise so that the vacuum draws through both ports 106 and 107 and corresponding collection cavities 141 and 140 of the separator.

The main vacuum line 220 includes a switchable relief line 221 vented to the atmosphere via port 222. This relief line, together with paired remotely controlled vacuum line valves 223 and 224 one each incorporated into the main vacuum line to the tank/separator and the relief line, allows for immediate redirecting of vacuum suction from the vacuum supply to either the separator, or the atmosphere. That is to say, the valves 223 and 224 may be operated inversely so that one is opened and one is closed to direct suction to the separator or the atmosphere. In this way, the suction to the separator may be more immediately be activated or deactivated than would be possible by control of the blower motor.

On the exhaust side of the vacuum supply 200, positive pressure supply port 205 is connected to positive pressure line 225 to deliver positive pressure air to the system. The positive pressure air is switchable, by means of a pair of remotely controlled positive pressure line valves 230 and 231, to be either directed to the atmosphere through silencer 232 or to provide positive air pressure into the solid hopper 320 via hopper pressure line 233.

As will be appreciated, the vacuum supply and positive pressure air lines (220, 225) are selected in accordance with the specification and performance of the blower. In this embodiment, the conduits forming the vacuum supply are formed predominantly of 4 inch diameter piping.

The system includes a network of conduits for transferring solid material and fluids. Conduits include a separator feed line 250, hopper outlet line 260 and a fluid transfer line 270. Flow control valves comprising manual, automatically and/or remotely operated valves are selectively positioned to control the flow of solid matter, liquid and air pressure as required.

Figure 6:
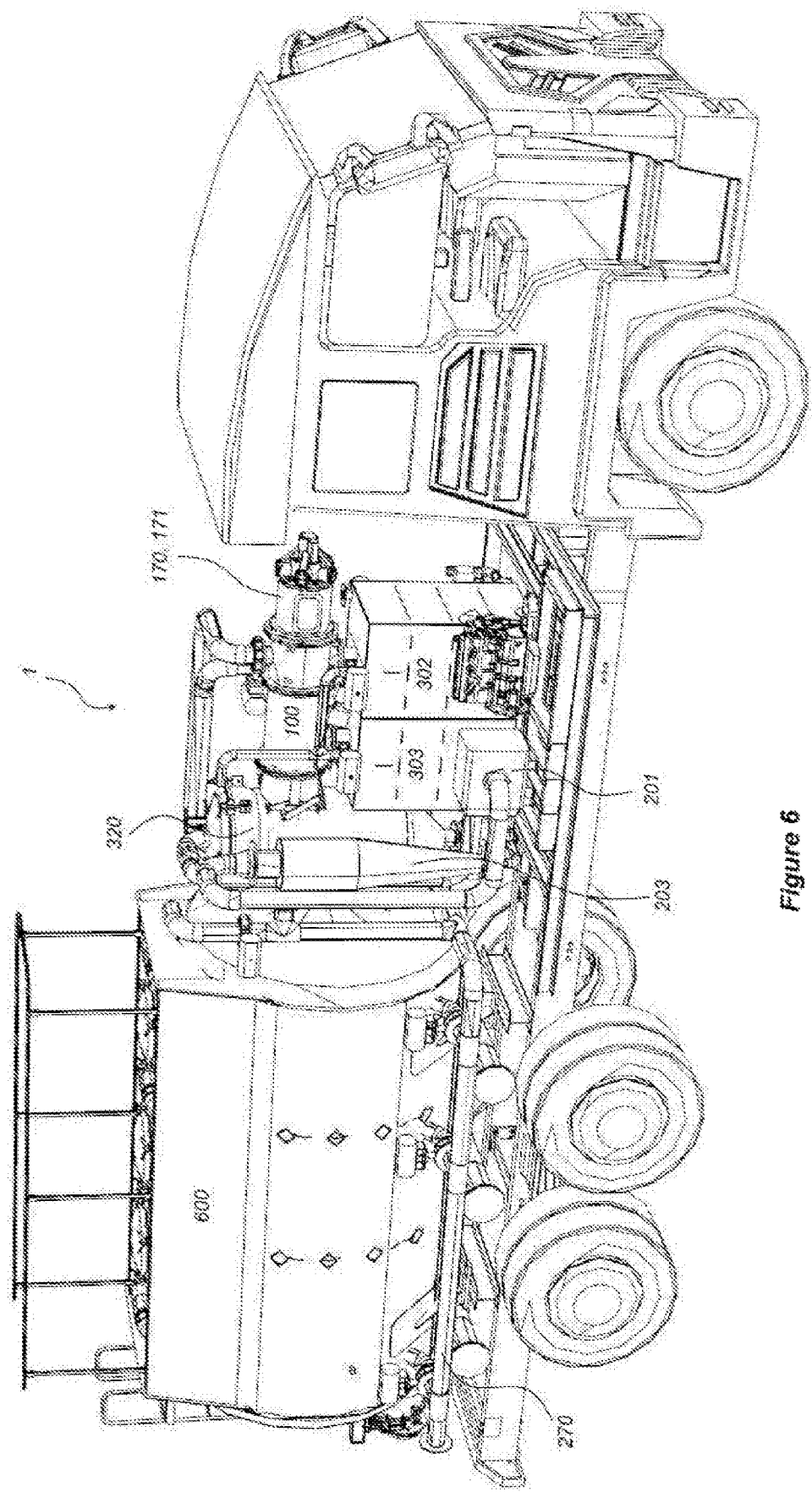
FIG. 6 is a perspective view of a vehicle mounted screw press separator in accordance with the invention.

By way of example, with reference to the embodiment shown in FIG. 6, the conduits are for the most part steel piping of 4 inch (approximately 100 mm) and suitable to withstand a negative pressure differential of more than 50 kPa and a positive pressure differential of more than 100 kPa. More preferably the conduits are rated to withstand a negative pressure differential of up to 100 kPa and a positive pressure differential of up to 200 kPa. Of course the pipe gauge should be selected in accordance with the system's capacity and flow requirements.

Where required, for instance at a join or to allow a small degree of movement between adjacent pipes, the system uses flexible vacuum tube of equivalent diameter. Sections of such tube may also be used at the extreme distal inlet, outlets of the network to provide extension hoses enabling manual positioning of nozzles and/or connection to other flow systems or tanks etc.

The flow control valves may be manually operated or operated automatically via the control system. In FIGS. 1, and 3-5, manual control valves are denoted by a small schematic "L" shaped handle. Manual control valves are generally provided where they are used less frequently, or only in emergency and preferably where the operator is provided with clear access. For instance, referring to the figures, each tank compartment includes a manual valve operable to allow draining of each respective tank compartment. Another manual valve is provided for periodically removing material captured by the cyclone separator.

Automatic remote control valves are preferably configured for wirelessly connection to the control system and adapted for remote automatic operation. This allows the control system to control each valve remotely either on individual or group instruction by the operator, or in accordance with a particular mode of operation of the system. Suitably this allows convenient configuration of the conveying network depending on the intended current operation mode of the system rather than the operator needing to manually access and operate each valve. Automatic remote control valves are denoted in the FIGS. 1, and 3-5 by means of an attached radio signal icon.

Referring to FIG. 1, as noted previously, the separator feed line 250 is connected to the inlet of the separator by an attachment flange on the feed housing inlet. A separator feed line inlet 251 is disposed at the distal end of the feed line, and is configured for attachment of a nozzle, additional flexible hose or other pipe or conduit, preferably by means of a cam lock fitting. A manual shut off valve 252 is provided adjacent the feed line inlet 251 to enable an operator manual shut off control of the separator feed line. A remote control separator feed line valve 253 is also incorporated into the feed line allowing flow to be controlled by the control system.

The hopper outlet line 260 is connected to the outlet 321 of the solid hopper 320. As with the separator feed line, a hopper outlet line outlet 261 disposed at the distal end of the hopper outlet line, is configured with a cam lock fitting for attachment of a nozzle, additional flexible hose 262 or other pipe, and a manual hopper outlet line valve 263 is disposed adjacent the hopper outlet line outlet 261.

The separator feed line 250 and the hopper outlet line 260 are connected near the respective distal ends by a cross feed line 265, incorporating a cross feed remote control valve 266. The cross feed line and valve can be used to direct outlet from the hopper through the mixture feed line and either back toward the press, or to the mixture feed line inlet, so as to use it as a solid outlet.

Each of the first and second discharge ports (106, 107) from the separator are connected to the respective first and second tank compartments by fluid discharge conduits 271 and 272. Each tank compartment is connected to the common fluid transfer line 270. As with the separator inlet and hopper outlet lines, a fluid transfer line outlet 273 disposed at the distal end of the fluid transfer line, is configured with a cam lock fitting for attachment of a nozzle, additional flexible hose or other pipe. A manual shut of valve 274 is disposed adjacent the end. Furthermore, flow from each of the tank compartments may be controlled by respective first and second fluid transfer line valves 275, 276. A fluid flow sensor 278 is also provided in the common fluid transfer line to monitor and measure the flow rate of fluid within the line.

In an alternative form of the invention not shown, a feed line cyclone filter is incorporated into the feed line 250 so that mixture for processing is drawn into the cyclone filter prior to entering in the screw press via the screw press inlet. As with the cyclone filter 203 the feed line cyclone filter separates the solid and liquid mixture from the air flow by vortex separation. The vacuum line 220 is connected to the cyclone filter to create a vacuum pressure in the cyclone filter and draw in the mixture. The feed line cyclone filter includes a lower converging hopper section having an outlet which is connected to the inlet of the screw press such that solid and liquid matter falls from the feed line cyclone filter into the separator inlet. It will be appreciated that this design obviates the need to direct the vacuum supply and pressure via the tank compartments and/or the housing of the separator.

The invention employs a control system 400 for monitoring and controlling the system components during various modes of operation. The control system includes a computer or PCD 401, user interface 402 and communications module 403 for connecting the control system to the various separator system components by means of a communications network for data exchange and control. The components for control include the automated valves, the blower, the screw press, the load cell system and other sensors used to monitor the separator system. These additional sensors include pressure sensors, flow sensors, and volume sensors.

The control system allows for remote individual and/or grouped adjustment and operation of system components.

This includes opening and closing of individual remote control valves and groups of valves, operation of motors, pumps and sensors. However the control system is preferably configured to run the separator system in pre-programmed modes. Each mode requires various valves to be opened or closed to establish or seal flow paths, and the various other components (blower, separator etc) to be activated or deactivated and otherwise controlled in a specific pre-determined manner. Failure to set a valve correctly, for instance, may lead to the system not functioning as required at best, and potentially catastrophic failure or damage to one or more system components. In this regard, the automatic nature of the system substantially reduces the risk of a valve being set incorrectly as compared to a full manual system where each valve must be set individually. As noted previously, the remote operation of the valves removes the requirement to provide clear access to the operator.

The user interface allows the control system to be controlled by a system operator. The user interface may be attached to or be part of the computer or a separate device connected to communications network, for instance, a touch screen device or access point.

The control network may comprise wired and wireless components. For instance, as shown in the figures the automatic valves, the screw press drive system and the blower all include wireless communication modules enabling wireless connection to the control system via a control network. Communication means may be wireless as indicated in the figures, wired or a combination of both wireless and wired.

The communications module 403 further includes a remote communication module employing remote communication means preferably utilising wireless, mobile communication networks including cellular networks. In this way the separator system and separator control system may be adapted for remote monitoring or remote monitoring and operational control.

The remote monitoring may provide for real-time data transmission of the systems operation, including mode of operation and data regarding the amount of fluid captured into the tank system.

In further embodiments where the system is adapted for mobile dispatch such as truck or trailer mounted, for instance as shown in FIG. 6, the control system may be linked to navigation or positional tracking systems such as wi-fi tracking, cell tower tracking or GPS type tracking systems. This allows remote and or subsequent monitoring of the system as well as remote confirmation of the systems position. Furthermore, optionally the remote communication system may be configured to interact with the control system and provide for remote control of the system.

In any of the above embodiments, heating means may be provided for heating the mixture to increase fluidisation and/or liquidation and decrease viscosity of any semi-liquids and liquids in the mixture thereby aiding the separation process. For instance many greases and fats exhibit solid like properties at low temperature but become fluid at elevated temperatures. Heating of the mixture may be particularly advantageous in colder regions.

Heating means may be disposed to heat the mixture before it enters the compression chamber, for instance heating elements or a hot air injection system may be incorporated into the inlet line so as to heat the mixture before it enters the separator. Alternatively or additionally, heating means may be configured to heat the mixture within the compression chamber.

In some embodiments heating means may be disposed to heat fluid exiting the compression chamber within the collection cavities and/or within any one or more of the collection tanks.

The heating means may take a variety of forms known in the art including electric heating elements; gas fired heaters and other heating equipment such as heat pumps. The heating means may be configured to apply heat to or within any of the various system components including any one or more of the compression chamber walls, the housing, the compression screw, or the tanks so as to heat the mixture and/or fluids. Alternative or additional, heating means may be provided by hot air injection from a heating system.

In operation the invention may be used in a variety of modes as will be described below. It should be noted that the depiction of liquid, solids and airflows including vacuums are intended for illustrative purposes only and are used to show the general modes of operation only in a schematic form. They are in no way intended to be representations of actual flows of material and vacuum in operation.

In a broad sense the invention also provides a method of extracting liquid phases from a mixture of one or more liquids and a loose, solid material, by squeezing and/or pressing the mixture in a separator including the steps of drawing the mixture into the compression chamber of a separator by means of vacuum differential pressure via a separator feed line conduit; applying pressure to the mixture in the compression chamber to expel the fluid form the solid material; collecting the liquid; and ejecting the solid material from the compression chamber.

Preferably the method includes the further step of collecting the material ejected from the compression chamber in a hopper and pressurising the hopper with positive pressure air to force the solid material out an outlet of the hopper.

With reference to FIG. 3A, in a first processing mode the system is configure by closing the valves 263, 266, 224, 230, 305, 274, 275, 276, 305 and 305a while valves 231, 223, 253, and 252 are opened. In the figure, open valves are depicted in outline while closed or stopped valves are shaded black. The vacuum supply 200 and blower are activated and the positive pressure line 225 from the blower is exhausted through silencer 232 to the atmosphere. The vacuum side draws air through vacuum line 220 thereby initiating a vacuum in the second compartment 303 of tank 301, illustrated in the figure by cross hatching which equalises in the first compartment 302. The low pressure in the tank compartments draws through the discharge/vacuum ports 106 and 107 via the feed and press sections of the compression chamber and through separator feed line 250 connected to the screw press inlet 102. Alternatively, the valve 305a may be closed so that a vacuum is established principally in the second compartment 303 of the tank 301 only thereby drawing primarily via port 107 of the separator.

It should be noted that the depiction of liquid, solids and airflows including vacuums and positive pressures as shown in schematic FIGS. 3A, 3B and 3C are intended for illustrative purposes only and used to show the general modes of operation in schematic form. They are in no way intended to be precise representations of flows of material and vacuum and positive pressures under operational conditions.

Mixture for processing including solid material, fluids sequestered therein and other fluids may be sucked up through the separator feed line 250 and into the feed section 130 of the separator. It will be appreciated that the nozzle must be submerged in or placed in close proximity to the matter to be drawn up. In this embodiment, a flexible vacuum hose may be attached to the separator feed line via cam-lock fitting allows the operator to direct the nozzle manually to the matter.

On entering the feed section 130 of the compression chamber via the open top 136 of the basket, any fluids which are freely mobile or only loosely bound to solid matter may be immediately drawn with the vacuum flow directly out through the basket and/or cage filter walls 135 and 137, and allowed to be swept along with the vacuum into the secondary tank compartment 303. For the most part fluid will fall to the bottom of the tank compartment 303 where it will remain. As indicated in the schematic, the vacuum line 220 is connected at a top section of the compartment 303 thereby minimising the tendency for fluid to be drawn into the vacuum line 220 and to the cyclone filter/blower. Solid matter including sorbent material and fluids sequestered therein are unable to pass through the basket screen 135 and are retained within the feed section 130 of the compression chamber of the screw press.

Motor 170 and transmission 171 controlled by the control system 400 a turn the compression screw 103 which moves the unprocessed mixture forward and into the press section 131 of the compression chamber by the auger effect of the screw.

Solid matter is prevented from exiting through the outlet 105 of the compression chamber by the choke member 123. Continual introduction and accumulation of matter in the press and outlet sections (131 and 132) of the compression chamber cause a compaction effect and formation of a "plug" of matter adjacent the outlet 105. As more matter accumulates under the auger effect of the compression screw, the compaction effect and pressure build thereby forcing any fluid within the matter or compression chamber to be expelled through the cage screen 137 and into the press collection chamber where it flows by both vacuum and gravitational forces into the first compartment of the collection tank.

With increasing compaction of the solids, eventually the pressure against the choke member is sufficient to overcome the bias spring holding the choke member 123 closed against the outlet 105. The solid/sorbent material, now substantially devoid of fluids, passes through the outlet and drops into the solids hopper 320 where it is allowed to accumulate.

As noted previously, the bias of the spring 163 is adjustable as is the speed of the motor turning the compression screw. Each must be carefully controlled by the control system and operator to provide for optimal extraction given the nature of the solid/sorbent material, and the rate at which it is vacuumed into the feed section of the compression chamber. Slower movement of the plug in outlet section of the compression chamber 104 and greater resistance by the choke 123 causes more fluid to pass through the screens 135 and 137, while faster movement and less pressure against the choke 123 will move the plug faster from the chamber 104, but leave more fluid held in the solid material.

In the above mode of operation the solid material is allowed to accumulate within the hopper 320 by holding valve 263 closed. At the conclusion of processing, to evacuate the hopper, silencer valve 231 is closed and hopper valve 230 opened thereby redirecting positive pressure into the hopper. This resultant pressure gradient between the hopper and ambient outside the hopper is used to force the solid material out through the main matter outlet line and out of nozzle 261 by opening manual valve 263. For safety, the hopper includes a vacuum safety relief valve in case of a blockage in the outlet.

In an alternate mode, shown in FIG. 3B, rather than allow processed solid/sorbent material to accumulate within the hopper, both vacuum and positive pressure from the blower are used to respectively, simultaneously draw unprocessed mixture into the screw press as described above and blow processed solid material from the hopper as it exits the press. In this way, it will be appreciated that the processed solid material does not accumulate in the hopper so that the system is operated in a continuous mode rather than by processing batches. That is to say, the unprocessed solid, liquid mixture is drawn into the separator via feed line 250, separated into solid and liquid phases by the separator, and the solid material ejected from the separator may be immediately and continuously blown out of the hopper. This allows the separation system to operate continuously rather than in discrete batches. Since the solids do not accumulate in the hopper, there is no need to monitor the level of fill.

As previously noted, alternative construction and configuration of the screw press, fluid discharge ports, tank and tank compartments, and vacuum lines are possible without departing from the invention. For instance, as previously described and illustrated in FIG. 2C, in one alternative configuration vacuum partition 120 is not used so that the feed and press collection cavities are joined. At least one fluid discharge port from the collection cavity feeds fluid expelled by the press into a single, common collection tank as shown in FIG. 3C. The vacuum line is connected to this tank and draws through the at least one discharge port via the collection cavity/s thereby creating a vacuum in the compression chamber to draw in mixture through separator feed line 250 connected to the screw press inlet.

Figure 7A:
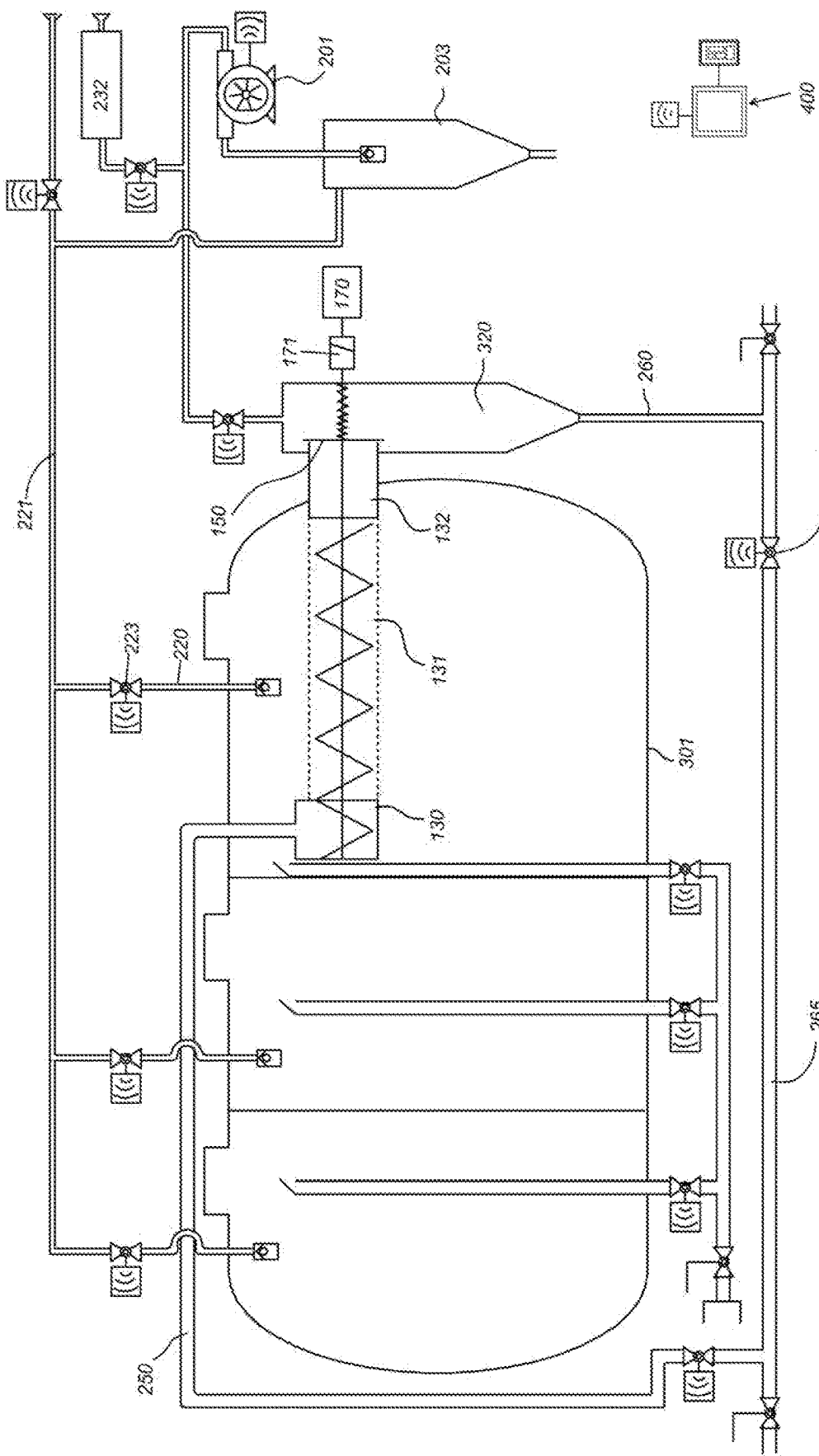
FIG. 7A is a schematic view of another embodiment of a separator system including a storage reservoir in accordance with the invention.
Figure 7B:
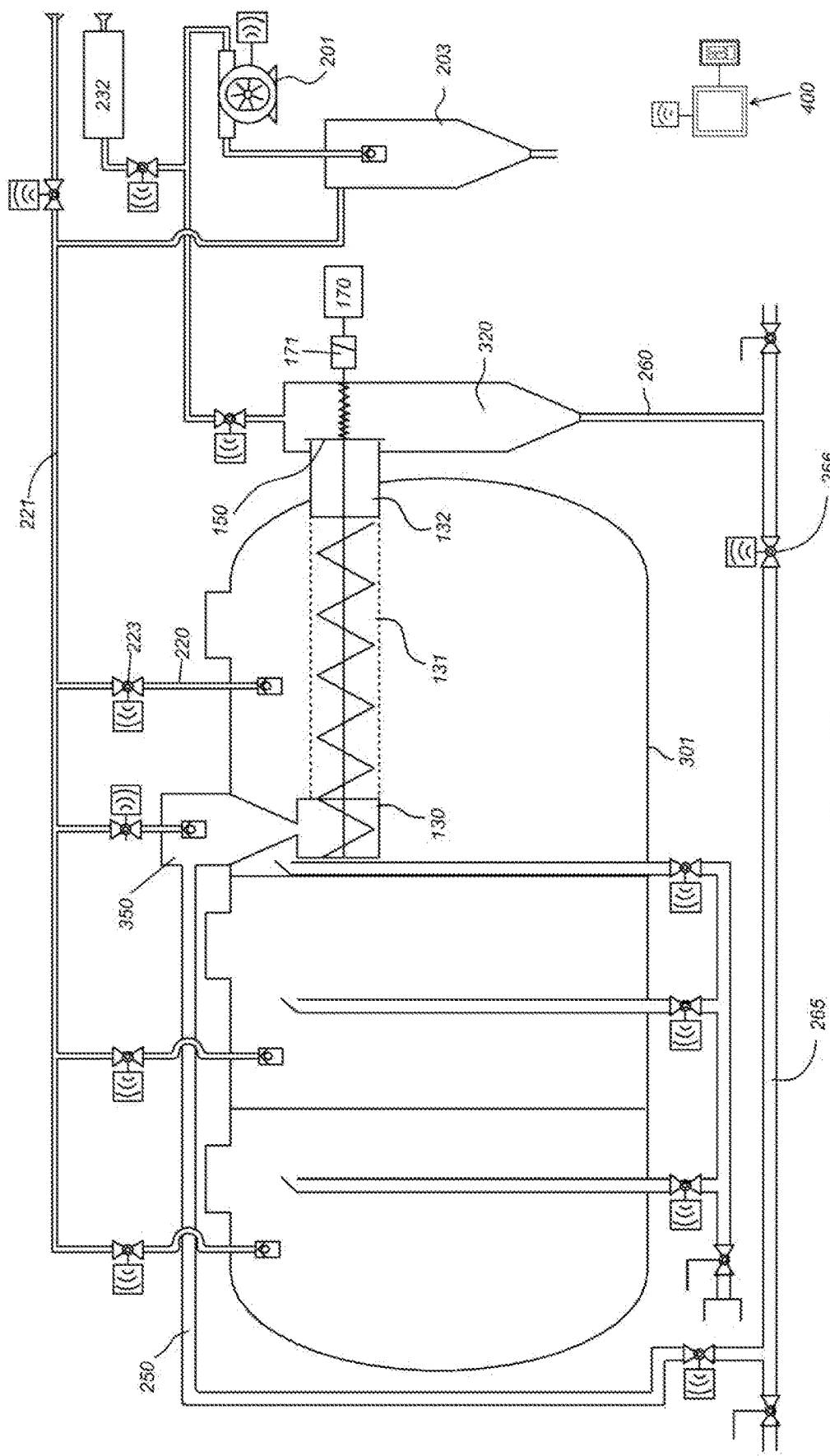
FIG. 7B is a schematic view of another embodiment of a separator system including a storage reservoir in accordance with the invention.

In other configurations of the invention as shown in FIGS. 7A, and 7B, the separator 100 is incorporated wholly or partially into the fluid collection tank 301 such that the tank 301 forms the air sealed housing thereby dispensing with the need to provide a dedicated separator housing. With reference to FIG. 7A, the inlet and press portions (130 & 131 respectively) are disposed within a compartment of fluid collection tank 301 while the outlet section 132 extends through the wall of the tank to discharge into the hopper 320.

In other embodiments however, only the press portion of the compression chamber are disposed within the tank.

The embodiment shown in FIG. 7A shows the tank 301 as a multi compartment tank having three compartments. This embodiment is intended with a specific application in mind as will be described later. However, it will be appreciated that the tank may have any number of compartments including a single compartment, as required.

As shown, the motor 170 and transmission 171 are repositioned to the outlet end of the separator, such that the compression screw shaft passes through the solids hopper 320. Alternatively however the motor and transmission may be housed within the tank.

Vacuum line 220 is connected to the tank compartment thereby to enable a relative vacuum to be generated within the compartment by means of the vacuum supply system. It will be appreciated that fluid pressed from the mixture in the compression chamber will pass though the filtration screens of the separator to be collected directly within the fluid collection compartment of the tank 301. It is noted that in this embodiment, the feed section 130 of the separator has solid impermeable walls without a filtration portion. As such the vacuum generated in the tank draws through the strainer basket of the press section and into the compression chamber thereby aiding in drawing the mixture into the press section of the chamber via the feed portion and inlet.

In the embodiments shown in FIGS. 7A and 7b, structural framework (not shown) is required to support the strainer cage.

In an alternative form of the invention shown in FIG. 7B, a feed line air filter 350 is incorporated into the feed line 250 so that mixture for processing is separated from the vacuum airflow prior to entering in the screw press via the screw press inlet. Advantageously the vacuum line 220 is connected to the filter 350 to create a vacuum pressure in the filter and draw in the mixture and substantially separate the solid and liquid mixture from the air flow. In one form the air filter includes a chamber having an inlet port connected to the feed line, a vacuum port for connection to the vacuum supply and generating a vacuum in the chamber so as to draw mixture along with air into the chamber via the inlet and feed line and a lower outlet allowing the mixture to fall from the chamber into the separator. The air and mixture entering through the inlet is directed away from the vacuum port toward the bottom of the chamber either by the aiming the inlet downwardly or by the use of deflection surface. The vacuum port is disposed preferably at or adjacent the top of the chamber. Advantageously, the semi-liquid nature of the mixture and its higher relative density results in it falling towards the outlet at the bottom of the chamber such that clean air is draw iout of the chamber from the vacuum port.

However in a preferred form as is shown in FIG. 7B, the feed line air filter includes at least one cyclone type air filter. The cyclone air filter 350 includes a lower converging hopper section having an outlet which is connected to the inlet of the screw press such that solid and liquid matter falls from the feed line cyclone filter into the separator inlet. It will be appreciated that this design obviates the need to direct the vacuum supply and pressure via the tank compartments and/or the housing of the separator, however as shown a vacuum line to the tank compartment is provided allowing the system to selectively draw vacuum through the cyclone air filter 350 or through the tank.

It will be appreciated that the present invention provides a system for separating a wide range of mixtures of a liquid and a loose solid material substantially into component liquid and solid phases. The system provides a continuous feed delivery system able to contend with mixtures of a wide range of flowable qualities. That is to say the vacuum feed system will contend with highly liquid mixtures such as sludge, to drier particulate materials such as grain. The system provides particular advantages for mixtures which cannot be pumped either because they are too dry or may damage pumping apparatus. It will be appreciated that in these and other respects, the invention represents a practical and commercially significant improvement over the prior art.

It will be appreciated that the separator system above may be adapted for use in specific applications. This may require provision of additional tanks and equipment as required depending on the application. For instance, as previously noted, additional tanks and fluid flow networks may be incorporated into the system.

By way of example only, in one particular application the device of the present invention may be used in conjunction with or to facilitate the invention described in the applicant's provisional application AU2016900851 filed on 8 March, 2016 and incorporated herein by reference, involves water remediation to remove pollutants from water waste streams. Sources of pollutants, including hydrocarbon based pollutants, in water waste streams arise from hospitals, laboratories, and certain industrial processing plants. In many cases, the pollutants must be removed or at least substantially removed from the waste stream to enable either reuse or recycling of the liquid or before discharge to a primary waste management system such as a sewerage system or waste treatment system.

For instance, hydrocarbon contamination is particularly evident in sewage water from restaurants, commercial kitchens, fast food outlets, and the like, which typically comprise fats, oils and/or grease from food preparation, cooking and clean-up processes, as well as particulate solid food waste including burnt or charred food waste. Many of the fats, oil and/or grease (FOG) from food related sources have low melting points and thus tend to solidify and coagulate with solid waste materials at cold water temperatures, and together with other waste, can form large foul smelling and unsanitary masses of insoluble fats known as fatbergs. Preventing and treating sewer damage caused by such fatbergs, as well as removing blockages to a mains sewage system places a significant cost burden on water/sewage authorities.

In an effort to reduce such contaminants entering the water network and water treatment facilities, commercial businesses are required to install, maintain and service a suitably sized grease trap or grease inceptor in an effort to substantially remove such contaminants from the waste stream and retain them onsite for other means of disposal. The pollutants will accumulate in the grease trap until they reach the maximum capacity of the trap at which point it must be serviced or cleaned otherwise the trap becomes ineffective. Servicing grease trap interceptors has been a problem for customers and haulers for many years. While some of the pollutants may be recyclable and reusable if isolated, cleaning conventional grease traps requires evacuating the whole trap including a substantial amount of waste water, which tends to increase haulage costs. In particular, because the number of grease traps which can be serviced by a single truck will be limited by the trucks capacity.

Furthermore, downstream processing trap waste is costly often meaning recycling has no economic advantage. For instance, a typical trap may be around 60-80 percent unusable product (water); around 15-20 percent food sludge or particulate matter and around 5-20 percent usable oil. However due to the high water content, it is often not economically viable to process and recover the usable oil.

Thus, in one aspect, AU2016900851 aims at replacing conventional methods and grease traps for separating contaminants from waste streams with decontaminant systems having a containment trap including a sorbent media for sequestering FOG's so they may be removed from the waste stream without emptying the entire grease trap. At some stage however, the sorbent material needs to be removed from the trap and replaced and preferably, the FOG's extracted from the sorbent media.

Figure 4A:
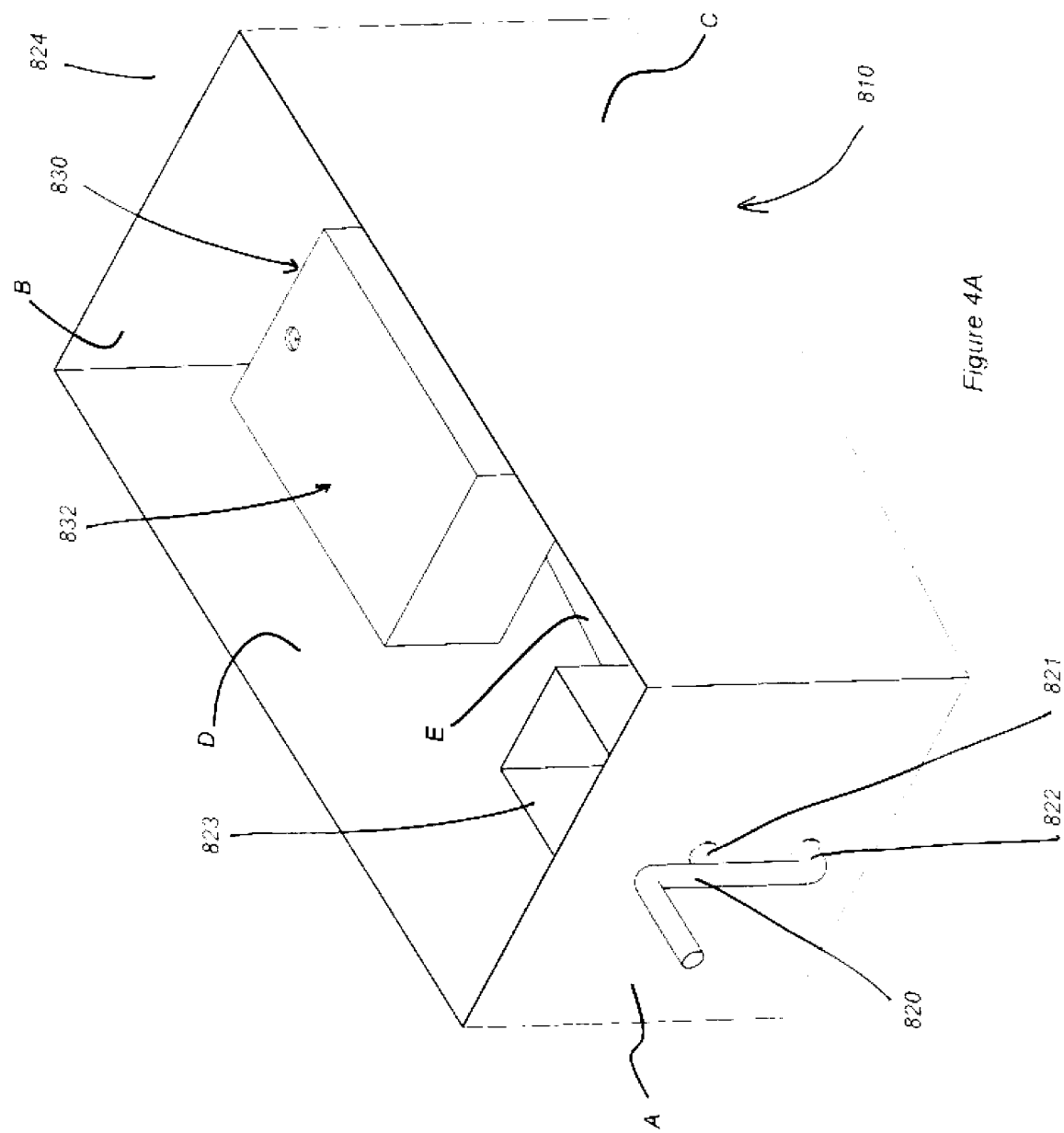
FIG. 4A is a perspective view of a grease trap system in accordance with the applicant's provisional application AU2016900851.

That is to say, the separator system above may be adapted and configured for servicing a waste stream decontamination system shown in FIG. 4A comprising a solids trap for separating the solid particulate material from the waste stream and a contaminant trap for removing the one or more pollutants by sequestering the pollutants within a containment trap.

In particular, the waste stream decontamination system is a grease trap system designed to remove solid, generally food particulate material and at least one pollutant comprised substantially of fats, oils and grease (FOG) contaminating waste water streams discharged by domestic and commercial kitchens or food production factories.

FIG. 4A, which shows a front top right isometric view of a 3D representation of an assembled waste stream decontamination system of the invention, being in particular a grease trap, illustrated generally by reference number 800. The assembled grease trap 801 shown is generally rectangular in shape is comprises of four side walls A-D, consisting of front wall A, rear wall B and two side walls C and D respectively, bounded by bottom wall E and defining a grease trap reservoir for holding waste stream liquid of a predetermined volume. The bottom wall E of the grease trap 801 shown has a downward slope aware from the inlet side of the grease trap reservoir. This means that during use over time any non collected solid particulate flows towards the rear end of the grease trap reservoir assisting in a full clean out if needed. In use, a top wall or cover F is positioned on top of the four side walls A-D, effectively closing off the grease trap when in use. The top wall or cover F or at least one or more portions of same are suitably adapted to be conveniently removed and/or accessed manually and/or automatically by appropriate mechanical means to assist in maintenance and periodic cleaning. For example, access portions positioned in the cover F over the solids trap 823 and contaminant trap 830 may be provided in cover F.

Figure 4B:
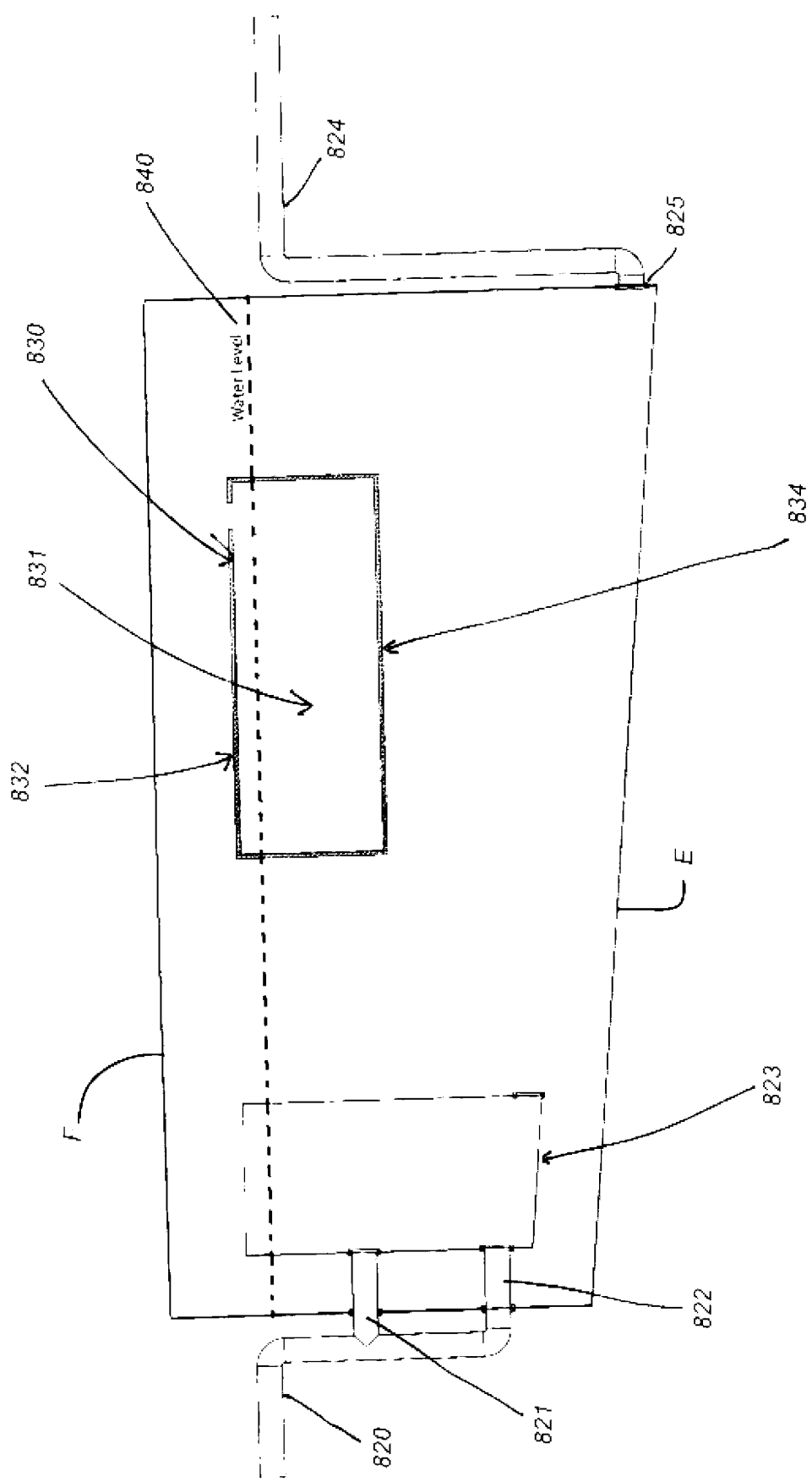
FIG. 4B is a side view a grease trap system shown in FIG. 4A.

Front wall A comprises an inlet pipe 820, which in this example, deviates or partitions into two sub-inlets, one being an upper sub-inlet 821 and the other being a lower sub-inlet 822. It will be understood that such a dual sub-inlet arrangement is useful in the instances of a blockage occurring in one of the sub-inlet lines. The upper sub-inlet 821 and the other being a lower sub-inlet 822 feed directly into solids trap 823 which in this example is mounted within the reservoir volume of the grease trap proximate to the front wall A and positions so as to reside in use in a substantially submerged position within waste stream liquid in the reservoir as shown in FIG. 4B. The solids trap 823 is fabricated from a mesh type material of small enough mesh size to allow waste stream liquid to flow from the solids trap 823 but to capture solid particulate in the trap. It will be understood that small enough particulate may escape the trap, so if desired, the solid trap 823 may be provided with a liner (not shown) of smaller still mesh size that can be used to reduce sedimentation and/or to give finer control to the collection of particulate if desired. It will be also appreciated that use of a disposable liner may allow for particularly convenient solids trap 823 cleaning.

Referring now to FIG. 4B which illustrates a section view of the waste stream decontamination system of FIG. 4A, the grease trap 800 also comprises a waste stream outlet 825 located in this example on rear wall B and continues on to outlet pipe 825 which runs to a sewage system (not shown), for example. The waste stream outlet 825 is located a lower portion of rear wall B to minimise risk of untrapped floating hydrocarbons being run off to the sewage system.

The grease trap 810 also comprises contaminant trap 830 which is mounted within the reservoir volume at a location away from the solids trap and in a position so as to reside in use in a substantially submerged position within waste stream in the reservoir as shown in FIG. 4B. In this example, the contaminant trap comprises a rectangular shaped basket or box which is fabricated from a meshed material of suitable mesh size to allow waste stream and hydrocarbon based pollutant to enter the contaminant trap 830, and treated waste stream to flow out of the contaminant trap 830, yet is fine enough to retain the sorbent material 831 before and after it has sorbed hydrocarbon from waste stream in the material's 831 proximity. The sorbent material 831 can be directly filled into the contaminant trap 830 or may further provided within a liner (not shown) provided in the contaminant trap 830 whereby such liner is of a material for example nylon that will retain sorbent but is permeable to waste stream. It will be appreciated that a removal/replaceable liner can be convenient used to shorten cleaning time. The contaminant trap 830 can also comprise a one way direction waste stream valve (not shown) that prevents ingress of waste stream, when for example, a vacuum is applied to the trap to remove the contents thereof.

In the grease trap 810 of FIG. 4A, the solids trap 823 and the contaminant trap 830 may comprise a lid 832, 834, which closes off the top of trap. Although not essential where the waterline 840 does not extend over the top of the traps, a lid is a useful safety feature in the event the grease trap 810 floods or the water level 840 rises above the topmost section of the traps. It will be understood that where a lid is provided, it is suitably adapted to be conveniently removed and/or accessed manually and/or automatically to assist in maintenance and periodic cleaning.

The contaminant trap 830 is provided with one or more hydrocarbon sorbent materials 831 which are suitable for selectively removal of hydrocarbon based pollutants from the waste stream. Sorbent material 831 captures the hydrocarbons within or onto the surface of the one or more hydrocarbon sorbent materials therein in preference to aqueous components present. The one or more sorbent materials are for example, oleophilic materials that preferential sorb hydrocarbon based pollutants over water or other aqueous fluids. That is to say, the sorbent materials are simultaneously oleophilic and hydrophobic sorbent materials.

With continued use the solids trap will fill with particulate material and the sorbent material will become substantially saturated with FOG. This requires servicing of the trap involving removal of the solid material from the solids trap and pollutant sequestered in the pollutants trap.

Figure 5A:
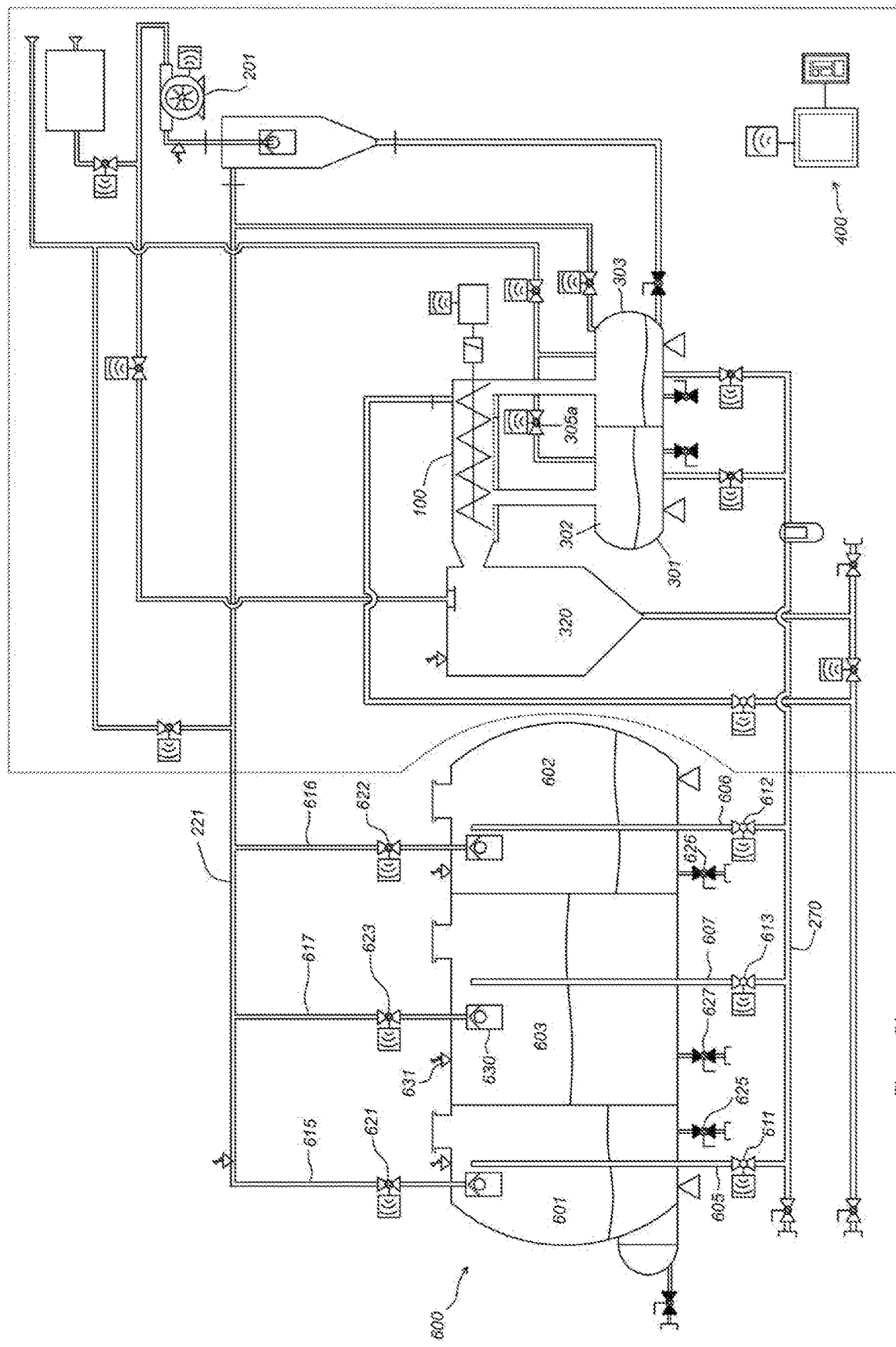
FIG. 5A is a schematic view of another embodiment of a separator system including a storage reservoir in accordance with the invention.

A plant for servicing of the grease trap shown in FIG. 4 is illustrated in schematic of FIG. 5A. It will be noticed that this plant largely comprises the separator system and separator previously described and shown in FIGS. 1 and 2 (depicted within broken line box) with an additional multi compartment storage reservoir 600 and extension of the fluid outlet and vacuum and venting lines to service each compartment of the storage reservoir.

A first compartment 601 of the storage reservoir 600 is adapted to store food and solid waste removed from the solids trap of the grease trap. A second compartment 602 is used to store fats, oils and grease extracted from the containment trap. A third compartment 603 is used to store used cooking oil ("UCO") which, while not a pollutant in a waste stream or captured by the grease trap system, is often a waste product of commercial kitchens and may be collected at the time of grease trap servicing, for convenience. In this way the system is designed to service a grease trap and remove segregated waste components in bulk. Preferably, the plant is designed to service multiple grease traps before reaching maximum storage capacity and requiring discharge of at a discharge station.

In one embodiment the reservoir is an 80000 L vacuum tank comprise three separate vacuum compartments of 2000 L, 2600 L and 3400 L capacity. The tank is rated to withstand a negative pressure differential of more than 50 kPa and a positive pressure differential of more than 100 kPa. More preferably the tank is rated to withstand a negative pressure differential of up to 100 kPa and a positive pressure differential of up to 200 kPa.

Each compartment of storage reservoir 600 is separately connected to the fluid outlet line 270 and vacuum supply line 221 by means of respective fluid and vacuum branch lines and respective remote controlled "twin" valves. That is to say, each compartment (601, 602 and 603) is connected to the fluid outlet line 270 by a respective compartment fluid line (605, 606 and 607) comprising automatic remote controlled fluid valve (611, 612 and 613), and to the vacuum line 221 by a respective compartment vacuum line (615, 616 and 617) comprising automatic remote controlled vacuum valve (621, 622 and 623). Operation of the respective "twin" fluid and vacuum valves for each compartment are preferably paired so that they are either both open or both closed. This "twin" operation seals each compartment to prevent overflow in transport and cross contamination of products. Each vacuum branch line also includes a ball float overflow safety shut of valve 630 and a vacuum safety relief valve 631 allowing the twin valve system to provide a secondary safety shut down.

Manual bottom drain valves (625, 626 and 627) are also provided for each compartment to allow draining. The entire reservoir is mounted on load-cells 630 to monitor tank weight.

Figure 5B:
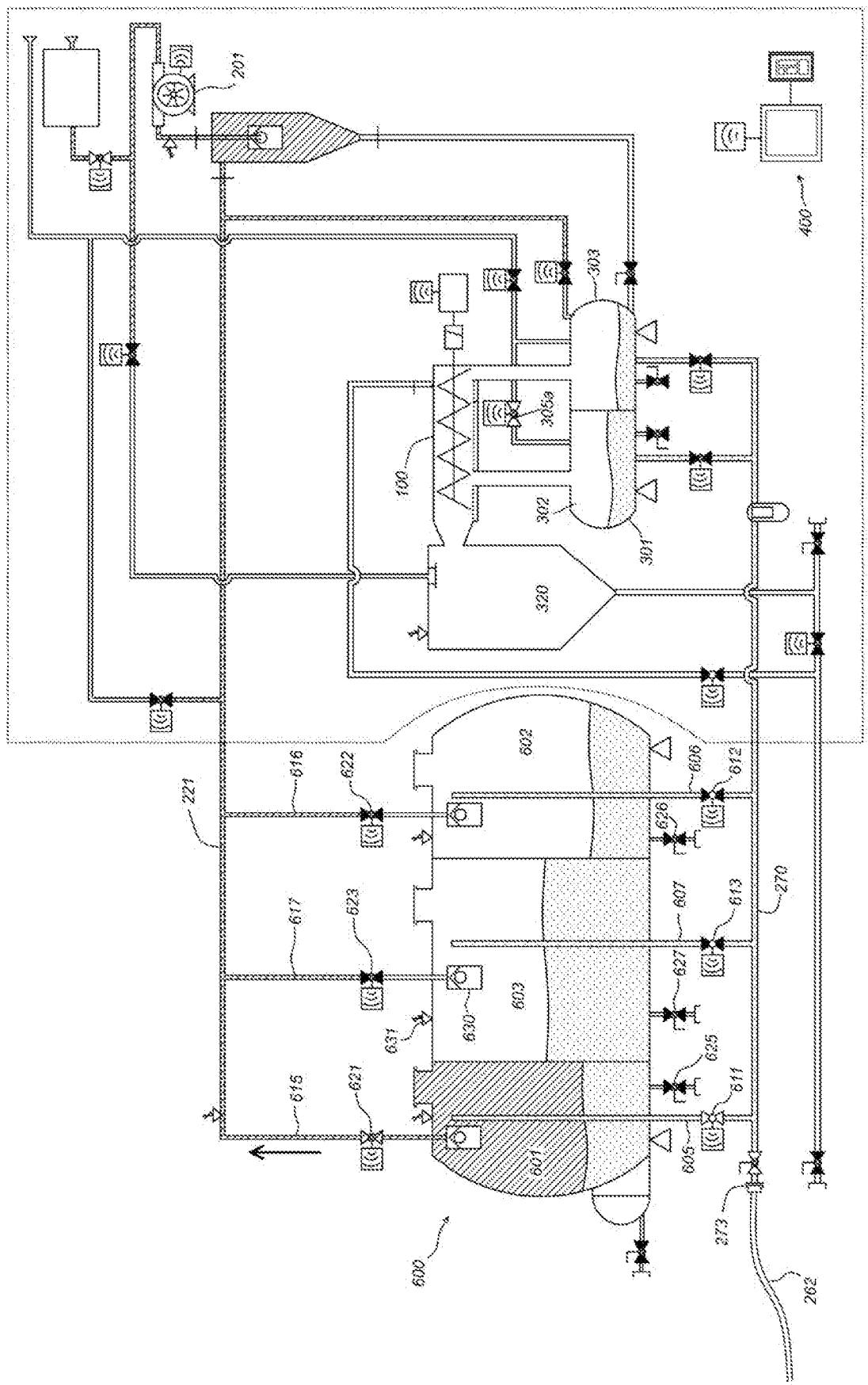
FIG. 5B illustrates the system of FIG. 5A operating in a first mode of operation.

In operation the twin valves and vacuum supply allow generation of a low pressure within any selected compartment of the reservoir to draw fluids into that compartment by suction. For instance, the first compartment 601 of the bulk storage reservoir is adapted to store food and solid waste removed from the solids trap of the grease trap. Configuring the valves as shown in FIG. 5B, connects the solids waste compartment with vacuum supply via vacuum supply line 221 by opening valve 621. Other branches (for instance to each other reservoir compartment and to the separator) on the vacuum line are sealed off by closing respective valves 612, 613 and 622, 623. Similarly the compartment fluid line valve 611 is opened and all other branches of the fluid outlet line are closed by closing respective valves.

The vacuum generated within the particulate food and solid waste compartment 601 of the reservoir enables the operator, with provision of suitable vacuum hosing 262 on attachment end 273, to suction the contents of the solids trap into the food and solid waste of the bulk storage reservoir. Suction of UCO into the UCO compartment of the bulk storage reservoir may be carried out in a similar manner.

Figure 5C:
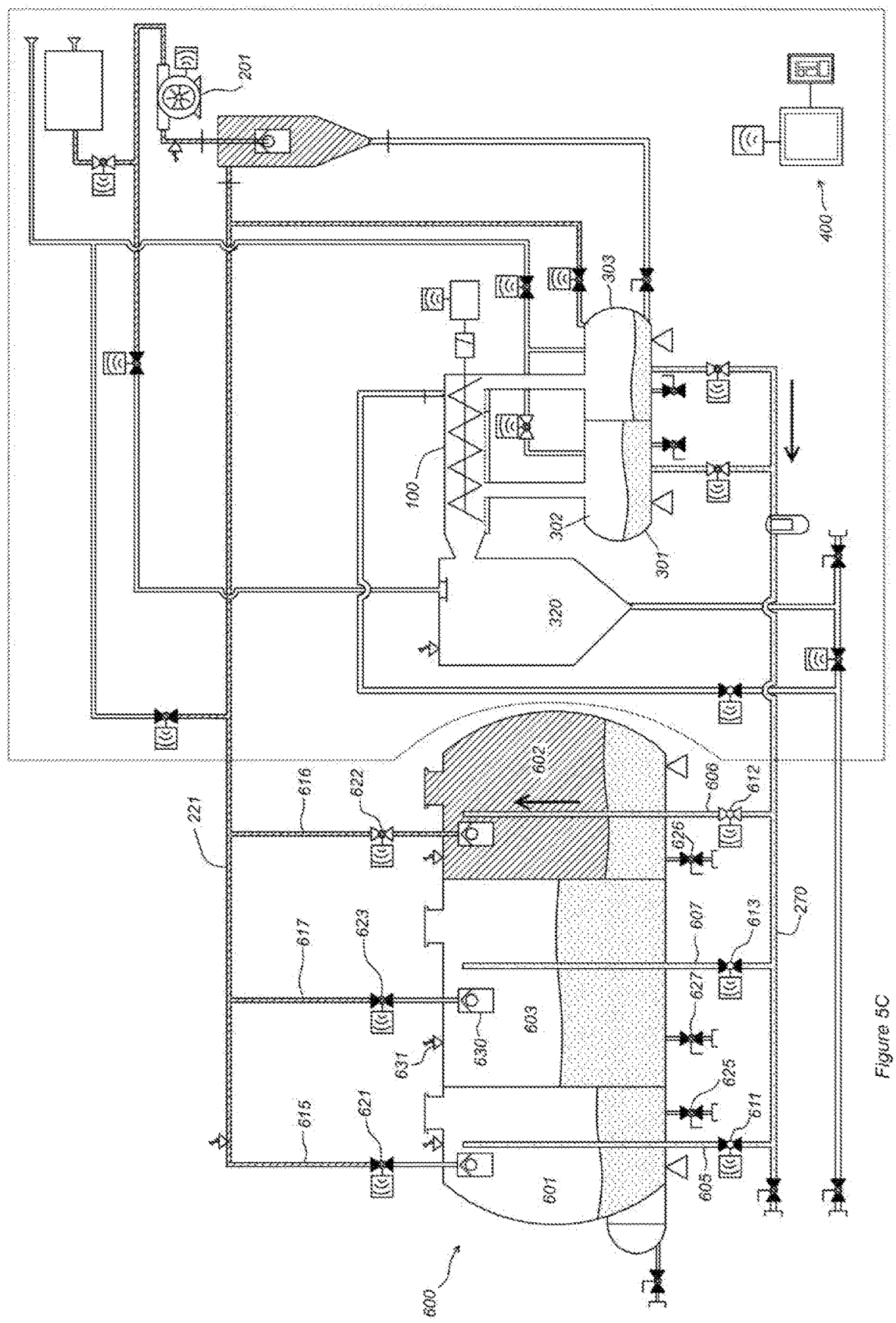
FIG. 5C is illustrates the system of FIG. 5A operating in a second mode of operation.
Figure 5D:
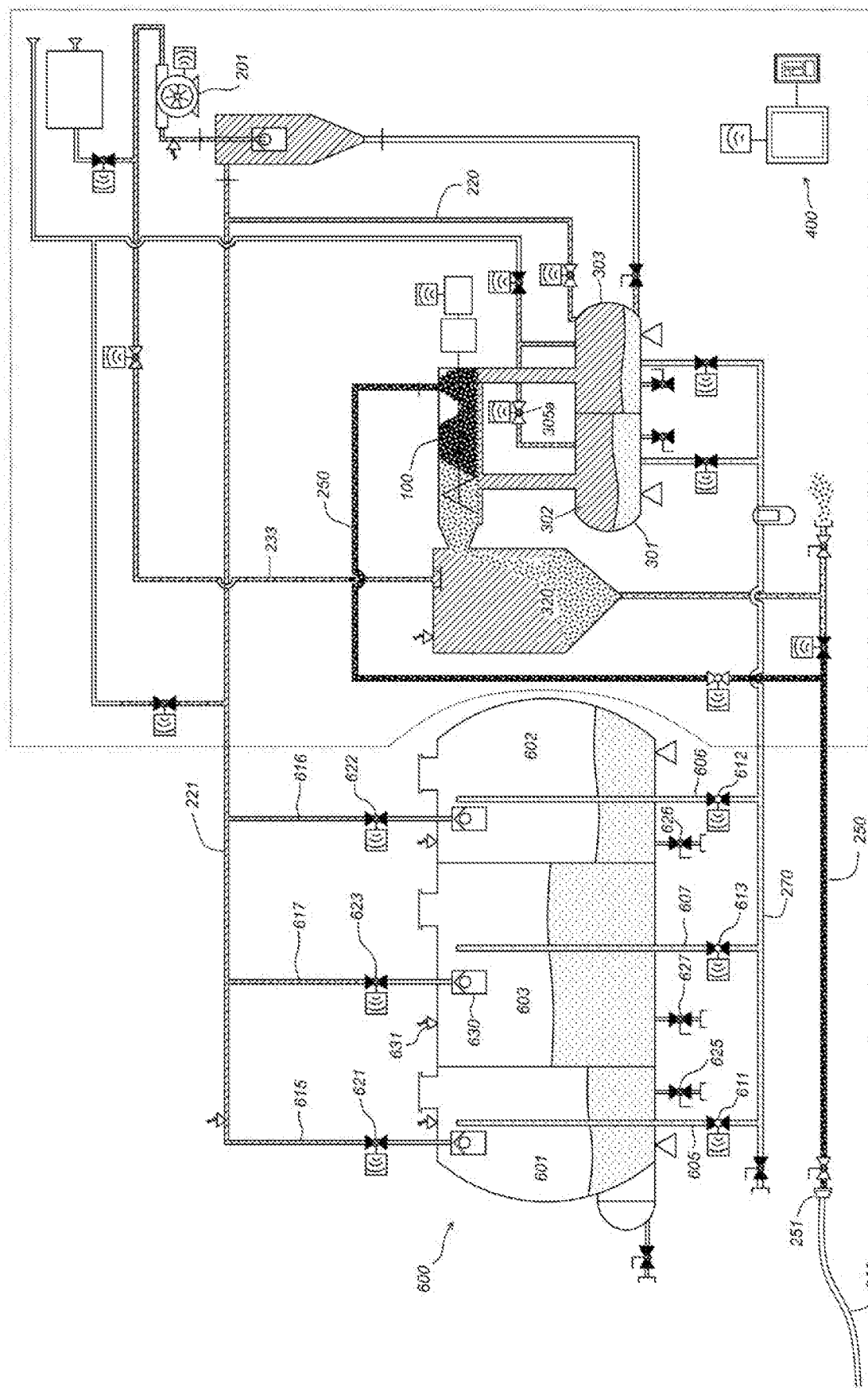
FIG. 5D illustrates the system of FIG. 5A operating in a third mode of operation.

The plant also allows fluid extracted by separator and held within tank compartments 301 and 302 to be transferred by fluid line 270 to one of the compartments of the storage reservoir—preferably the compartment 602 designated for FOG. The valves are configures as shown in FIG. 5C whereby the vacuum supply is used to create a vacuum in compartment 602 which draws fluid from one or both of the first and second compartment of the collection tank 301 by opening valves 275 and or 276 from the collection tank and 612 into the FOG compartment 602 of the storage reservoir.

Alternatively, in an embodiment of the invention not illustrated, the positive pressure line from the blower can be connected to any one or more of the tank compartments (301, 303, 601, 602 and 603) to induce a positive air pressure in the compartment and blow out liquid material in the tank via the drain valves.

While the system described in FIG. 5A has been developed for a particular use, it will be appreciated that plants incorporating similar single or multi-complement tanks may be used in other applications. Furthermore, the system may also be embodied in other forms.

For instance the systems shown in schematic representation in FIGS. 7A and 7B are alternative embodiments of the system of FIG. 5A whereby the separator 100 has been incorporated into the first compartment 601 as previously described. Use of the system will now be described with reference to the application of servicing/cleaning a grease trap Use of the system will now be described with reference to the application of servicing or cleaning a grease trap as recited in AU2016900851. Grease trap servicing involves removal of solids and particulate waste collected in the solids trap, removal and processing of the sorbent material from the containment trap to extract FOG, and recharging the trap with sorbent material substantially devoid of pollutant FOG.

For this purpose the entire plant depicted in FIGS. 5 and 7 is configured to be mobile and transportable, preferably truck (or trailer) mounted so it may be driven in close proximity to the grease trap. By way of example, a truck mounted mobile plant for servicing grease traps in accordance with the invention is illustrated in FIG. 6. As noted, the three compartment design allows the plant to perform a specific task such as recover a portion of trap waste or entire trap if necessary. As noted the plant is also able to collect other pollutants such as used cooking oil (UCO) when servicing a grease trap.

All key components of the plant are automated by way of the control system 400 and are able to be operated by the remote user interface allowing the operator to configure the plant as required to perform a specific function with simple commands. As noted previously, the automatic nature of the system substantially reduces the risk of a component being set incorrectly as compared to a full manual system where each valve must be set individually. The remote function also allows the operator to maintain a watch on important aspects of the plant without being drawn away to operate particular components.

Located adjacent the grease trap, the cover F of the grease trap 10 is removed, or access ports in the cover F therein are opened to allow operator or mechanical access to the traps. Particulate captured in the solids trap 23 is removed first and in preference to the contaminant trap 30 for the beneficial reasons described in AU2016900851 and later herein. Suitably, the operator attaches a length of flexible vacuum hose to the cam lock fitting on the fluid outlet line 273 of the system and inserts the free end of the hose into the solids trap, and more particularly into the lower section of the solids trap where solid and solid particulate material has accumulated.

The operator then selects the solids/sludge removal mode on the user interface 402 of control system 400 which to configures the system as shown in FIG. 5B enabling particulate matter and water from the solids trap to be drawn up and into the particulate food and solid waste compartment 601 of the bulk storage reservoir.

It is preferable to minimise the amount of additional, non-waste material, mainly water removed from the trap. That is to say, there are benefits from the perspective of minimising clean up, transport, storage and disposal of waste products from the grease trap 810 by capturing a maximum amount of waste material and a minimum amount of other matter, such as water etc which may acceptably enter the standard sewage system and does not require separate disposal. Accordingly, a preferred and predetermined volume of material for a particular capacity grease trap is drawn from the solids trap corresponding to the known volume capacity of the solids trap reservoir.

Advantageously, the removal of such a specified volume of material causes the water level within the grease trap to drop, preferably substantially or wholly exposing the contaminant trap. For instance, the precise positioning of solids trap 823 and contaminant trap 830 within the grease trap with respect to the normal, in use, water line 840, is such that removal of collected particulate from a substantially full solids trap 823 has the effect of causing a drop in the level of waste stream in the grease trap such that a substantial amount of waste stream drains away from the contaminant trap 830. In other words, in use, on emptying the solids trap 823, the water level 840 surrounding the submerged contaminant trap 830 is reduced such that the contaminant trap 830 and particularly the sorbent material is exposed and may be emptied conveniently without simultaneous removal of significant amounts of waste stream liquid with the collected hydrocarbon.

As an alternative, the containment trap may be removed from the grease trap or at least elevated above the level of the waste stream in the grease trap so as to allow any waste stream to drain from the containment trap before cleaning.

The sorbent material and hydrocarbon can then be treated to remove and recover the hydrocarbon component. Advantageously this may be achieved with the separator system components previously described and with particular reference to FIG. 5D.

The operator may then connect a length of flexible vacuum hose 262 to the cam lock attachment end 251 of the separator feed line and insert it into the containment trap. The operator then selects the first processing mode depicted in FIG. 3A, and shown in FIG. 5D. Once again, in the figure, open valves are depicted in outline while closed or stopped valves are shaded black. As before, the vacuum supply is activated and the positive pressure side of the blower is connected to positive pressure line 213 which is routed to exhaust through silencer 204 to the atmosphere. The suction side draws air through vacuum line 221 thereby initiating a vacuum in the tank 301. The low pressure in the tank draws through the discharge ports 106 and 107 via the feed and press sections 130 & 131 of the compression chamber and through separator feed line 250 connected to the screw press inlet 102. The mixture of sorbent material and sorbed fats, oil and grease components are drawn into the separator and separated as previously described.

Where sorbent material comprising the sorbed fats, oil and grease component is hydrophilic is removed in this manner, it is advantageously substantially free of water or other aqueous contaminants. However as noted, any liquid water present in the mixture may be encouraged to separate from the sorbent material without substantial compression, thus be discharged from the feed section 130 of the compression chamber and into the second discharge/vacuum port 107 and second storage compartment 302. In this regard, advantageously fluid captured in the second storage compartment 302 may have a higher water component than that captured in the first collection compartment 301.

As a further alternative method, the sorbent material may be freely disbursed within the trap. Advantageously the sorbent material and sorbed FOG will float on the surface of the water in the trap enabling the operator to selectively and preferentially vacuum the sorbent material and FOG into the separator by maintaining the hose end at or near the top of the fluid in the trap. It is possible that a greater amount of waste stream liquid (in this case water) will be drawn into the separator and extracted into the tank 301 along with the FOGs.

In the above mode of operation, following processing in the separator, the sorbent material now substantially free of FOG and liquids, is allowed to accumulate within the hopper 320. Advantageously the hopper is sufficiently sized to accommodate at least the entire contents of a sorbent material in a single containment trap. At the conclusion of processing, the viability of the sorbent material captured in the hopper is assessed. If it is determined to be acceptable to be reused, it may be returned to the containment trap of the grease trap by means of the same separator feed line, under pressure of the blower as previously described. If the sorbent material is determined to be unacceptable for reuse it may be discharged into an alternative receptacle for disposal. The containment trap of the grease trap is then recharged with clean sorbent before the trap is resealed.

Depending on the nature of the sorbent material used, the sorbent material may be suitable for single use or multiple uses. Thus, in some embodiments, the sorbent material may be disposable after a single or limited number of uses, for example, from 2 to 5 uses, whereas in other embodiments, the material can be used for multiple decontamination cycles prior to disposal. Suitably, multiple decontamination cycles involve greater than 5 reuses, and/or rounds of sorbent material recycling. Where the pollutant cannot be easily removed from the sorbent material through pressing or squeezing for example, it will be appreciated that the material may be best suited for single use and subsequent disposal after removal from the trap.

The liquids collected in the tank compartments may be transferred to the storage reservoir as previously described and depicted in FIG. 5C. The fluids may be transferred to other facilities for further processing to separate any waste stream fluid from FOG's. It will be appreciated that the system shown in FIG. 5 provides a system and method for servicing and cleaning a grease trap having a solids trap and a containment trap including a sorbent material for sorbing FOG.

In related applications, the separator system may also be used to dewater solid and sludge material, particularly in grease traps and or drains. For example the system may be used to unblock "fatbergs" from drains by vacuuming in the sludge material and separating the fluids including FOG from solid matter.

As noted previously the system or similar systems embodying the invention may be used in a variety of other applications require separation of a liquid/solid mixture into liquid and solid phases including sewerage and waste management; food production; agricultural, chemical and industrial processing and production; mining operations; recycling and refining and the removal of pollutants or contaminants either in solid or liquid form. Other separation applications include energy/biogas/biofuel processing, fracking and coal seam gas production; de-fluidising drill cuttings from borehole drilling operations, screenings; and clarifier sludge operations.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, compartments, components, regions, layers and/or sections, these elements, components, compartments, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention claimed is:

1. A separator system for separating a mixture of one or more liquids and a loose, solid material, substantially into liquid and solid phases, the separator system comprising:
    a housing having a housing wall defining a sealed housing interior;
    a compression separator for separating liquid from the solid material by compression, the separator having a compression mechanism including a mixture compression chamber located within the housing interior, the compression chamber having a compression chamber wall including at least one filtration portion for retaining solid material within the compression chamber under compression while allowing fluid expelled from the solid material to pass through the filtration portion to be collected within a fluid collection cavity disposed between the compression chamber and the housing walls;
    an inlet connected to the compression chamber for introducing mixture into the separator through the housing wall;
    a solids outlet allowing processed solid material to be ejected from the compression chamber and housing;
    at least one discharge port for discharging fluid from the housing; and
    a vacuum supply system including a blower said vacuum supply system fluidly connected to the collection cavity to generate a vacuum within the cavity thereby drawing air through said at least one filtration portion and from the inlet via the compression chamber so as to draw unprocessed mixture through the inlet and into the compression chamber.

2. The system of claim 1 wherein, the vacuum system is fluidly connected to the housing via at least one vacuum port.

3. The system of claim 1 further comprising a collection tank for collection of the fluid and wherein the collection tank is connected to or part of the housing.

4. The system of claim 1 wherein, the compression chamber is elongate having an upstream end opposite a downstream end, and the compression mechanism includes: a compression screw having a screw shaft supporting a spiral screw vane, said compression screw mounted for rotation about a longitudinal screw axis within the elongate compression chamber, the compression screw for moving the mixture through the elongate compression chamber from the inlet at the upstream end of the chamber, to the solids outlet at the downstream end of the compression chamber, and for compacting the mixture within the compression chamber.

5. The system of claim 1 wherein, the compression chamber further comprises axially aligned feed and press sections, wherein the feed section is disposed adjacent the inlet at the upstream end of the compression chamber and the press section is disposed downstream the feed section,
wherein the at least one filtration portion includes a first filtration portion and a second filtration portion,
wherein the press section of the compression chamber wall is formed of a cylindrical strainer cage thereby providing said first filtration portion for retaining solid material under pressure while allowing fluid to pass from the compression chamber into the fluid collection cavity, and
wherein the feed section of the compression chamber wall includes a strainer basket having an open top disposed adjacent the inlet, the strainer basket thereby providing a second said filtration portion for retaining solid material under pressure while allowing fluid to pass from the compression chamber.

6. The system of claim 5 wherein, the strainer basket and cage are spaced from the housing wall thereby forming respective feed and press collection cavities disposed between the strainer basket and cage and the housing wall.

7. The system of claim 1 wherein, the downstream end of the compression chamber opens through a peripheral rim of said housing to define the solids outlet and wherein a solids outlet regulator includes a door choke member moveable between a closed position to cover and close off the solids outlet thereby preventing ejection of solids from the separator via the outlet, and an open position allowing solid material to be ejected from the separator under compression.

8. The system of claim 7 wherein the compression mechanism includes a compression screw having a screw shaft supporting a spiral screw vane; and said door choke member comprises:
a tubular support sleeve coaxially mounted on a portion of the compression screw shaft extending from the housing beyond the solids outlet; and
an annular outlet cover plate, said cover plate extending radially from said sleeve,
wherein said sleeve is axially slidable on said compression screw shaft for moving the door choke member between the closed position where said plate sealingly abuts the peripheral rim of the housing and the open position wherein said plate is spaced from the peripheral rim of the housing.

9. The system of claim 8 comprising a door choke member biasing arrangement to bias the door choke member and cover plate toward the closed position.

10. The system of claim 1 wherein the system comprises a separator feed line connected to said mixture inlet.

11. The system of claim 1 wherein the solids outlet opens into a solids hopper for receiving solid material discharged from the separator and the hopper includes a hopper outlet disposed at a lower section of the hopper for emptying the hopper of solid material.

12. The system of claim 11 wherein said solids hopper is substantially air sealed and connected to a source of positive air pressure to generate a positive air pressure within said hopper to blow solid material in the hopper through the hopper outlet and wherein the source of positive air pressure is an exhaust of the vacuum supply system.

13. A method of extracting a liquid from a mixture of one or more liquids and a loose, solid material, by squeezing and/or pressing the mixture in a separator system, the separator system comprising:
a housing having a housing wall defining a sealed housing interior;
a compression separator for separating liquid from the solid material by compression, the separator having a compression mechanism including a mixture compression chamber located within the housing interior, the compression chamber having a compression chamber wall including at least one filtration portion for retaining solid material within the compression chamber under compression while allowing fluid expelled from the solid material to pass through the filtration portion to be collected within a fluid collection cavity disposed between the compression chamber and the housing walls;
an inlet connected to the compression chamber for introducing mixture into the separator through the housing wall;
a solids outlet allowing processed solid material to be ejected from the compression chamber and housing;
at least one discharge port for discharging fluid from the housing; and
a vacuum supply system including a blower said vacuum supply system fluidly connected to the collection cavity to generate a vacuum within the cavity thereby drawing air through said at least one filtration portion and from the inlet via the compression chamber so as to draw unprocessed mixture through the inlet and into the compression chamber; wherein the method comprises:
drawing the mixture into the separator by vacuum differential pressure;
applying pressure to the mixture in the compression chamber to expel the fluid form the solid material;
collecting the liquid in a collection tank; and
ejecting the solid material from the compression chamber.

14. The method of claim 13 whereby the solid material is ejected into a hopper and including the further step of positively pressurising the hopper to expel solid material from the hopper.

15. The method of claim 13 whereby the steps are performed simultaneously.

16. The system of claim 1 wherein, the blower is positive displacement blower which is driven by a motor.

17. The system of claim 1 wherein the vacuum supply system includes a cyclone filter connected upstream of the blower for substantially removing solid and liquid matter.

18. The method of claim 13 wherein, the blower is positive displacement blower which is driven by a motor.

19. The method of claim 13 wherein the vacuum supply system includes a cyclone filter connected upstream of the blower for substantially removing solid and liquid matter.

20. The system of claim 3 wherein the vacuum system is fluidly connected to the collection tank by means of a vacuum port disposed at an upper portion of said collection tank for the drawing air through the collection tank.

21. The method of claim 13 wherein the vacuum system is fluidly connected to the collection tank by means of a vacuum port disposed at an upper portion of said collection tank for the drawing air through the collection tank.

22. A separator system for separating a mixture of one or more liquids and a loose, solid material, substantially into liquid and solid phases, the separator system comprising:

a housing having a housing wall defining a sealed housing interior;

a compression separator for separating liquid from the solid material by compression, the separator having a compression mechanism including a mixture compression chamber located within the housing interior, the compression chamber having a compression chamber wall including at least one filtration portion for retaining solid material within the compression chamber under compression while allowing fluid expelled from the solid material to pass through the filtration portion to be collected within a fluid collection cavity disposed between the compression chamber and the housing walls;

an inlet connected to the compression chamber for introducing mixture into the separator through the housing wall;

a solids outlet allowing processed solid material to be ejected from the compression chamber and housing;

a collection tank for collection of the fluid and wherein the collection tank is connected to or part of the housing; and a vacuum supply system including a blower said vacuum supply system fluidly connected to the collection cavity to generate a vacuum within the cavity thereby drawing air through said at least one filtration portion and from the inlet via the compression chamber so as to draw unprocessed mixture through the inlet and into the compression chamber;

wherein the vacuum system is fluidly connected to the collection tank by means of a vacuum port disposed at an upper portion of said collection tank for the drawing air through the collection tank.

\* \* \* \* \*